US012472766B2

(12) United States Patent
Maruoka et al.

(10) Patent No.: US 12,472,766 B2
(45) Date of Patent: Nov. 18, 2025

(54) SURGICAL INK, PRODUCTION METHOD FOR SAID INK, AND SURGICAL PEN USING SAID INK

(71) Applicants: National Center for Global Health and Medicine, Tokyo (JP); YASUI Co., Ltd., Miyazaki (JP)

(72) Inventors: Yutaka Maruoka, Tokyo (JP); Toshihisa Toyokuni, Hyogo (JP); Mori Yokoyama, Hyogo (JP); Kei Oomoto, Tokyo (JP); Go Aradono, Miyazaki (JP)

(73) Assignees: JAPAN INSTITUTE FOR HEALTH SECURITY, Tokyo (JP); YASUI CO., LTD., Miyazaki (JP)

( * ) Notice: Subject to any disclaimer, the term of this patent is extended or adjusted under 35 U.S.C. 154(b) by 0 days.

(21) Appl. No.: 18/834,792

(22) PCT Filed: Feb. 17, 2023

(86) PCT No.: PCT/JP2023/005806
§ 371 (c)(1),
(2) Date: Jul. 31, 2024

(87) PCT Pub. No.: WO2023/157953
PCT Pub. Date: Aug. 24, 2023

(65) Prior Publication Data

US 2025/0108654 A1 Apr. 3, 2025

(30) Foreign Application Priority Data

Feb. 18, 2022 (JP) ................................ 2022-023504

(51) Int. Cl.
*B43K 8/02* (2006.01)
*C09D 11/16* (2014.01)

(52) U.S. Cl.
CPC .............. *B43K 8/026* (2013.01); *C09D 11/16* (2013.01)

(58) Field of Classification Search
CPC .......... B43K 1/006; B43K 1/12; B43K 23/12; B43K 23/122; B43K 23/124; B43K 23/126; B43K 23/128; C09D 11/16; C09D 11/17
See application file for complete search history.

(56) References Cited

U.S. PATENT DOCUMENTS 3,623,941 A * 11/1971 Goodenow .............. B43K 1/12
401/292
3,802,788 A * 4/1974 Danjczek ............... B43K 23/12
401/258

(Continued)

FOREIGN PATENT DOCUMENTS

CN 204307216 U 5/2015
CN 215662652 U 1/2022

(Continued)

OTHER PUBLICATIONS

International Search Report mailed Apr. 25, 2023, issued for the corresponding International patent application No. PCT/JP2023/005806, with English translation, 9 pages.

*Primary Examiner* — David P Angwin
*Assistant Examiner* — Bradley S Oliver
(74) *Attorney, Agent, or Firm* — LUCAS & MERCANTI, LLP

(57) ABSTRACT

A surgical ink is suitable for medical devices that ensure safety in accordance with the sterilization validation and can be widely distributed on the market, and has biocompatibility and writing property, and a surgical pen has good writing convenience. A surgical pen having radiation resistance includes: a cylindrical shaft body portion having a storage part for a surgical ink; and a pen tip portion for discharging (Continued)

the ink at a distal end of the shaft body portion, and the pen tip portion is made of a synthetic resin, and has a bending strength of 1.0 N or more after irradiation with γ-rays of 25 kGy to 70 kGy.

6 Claims, 10 Drawing Sheets

(56) References Cited

U.S. PATENT DOCUMENTS

| | | | | | |
|---|---|---|---|---|---|
| 5,626,430 | A | * | 5/1997 | Bistrack | B43K 5/005<br>401/6 |
| 5,909,978 | A | * | 6/1999 | Giordano | B43K 8/06<br>401/199 |

FOREIGN PATENT DOCUMENTS

| | | | |
|---|---|---|---|
| JP | S62-204754 | A | 9/1987 |
| JP | H10-194998 | A | 7/1998 |
| JP | 2007-262062 | A | 10/2007 |
| JP | 2009-011518 | A | 1/2009 |

* cited by examiner (a)

(b)

(a)

(b)

SURGICAL INK, PRODUCTION METHOD FOR SAID INK, AND SURGICAL PEN USING SAID INK

CROSS REFERENCE TO RELATED APPLICATION

This Application is a 371 of PCT/JP2023/005806 filed on Feb. 17, 2023, which, in turn, claimed the priority of Japanese Patent Application No. 2022-023504 filed on Feb. 18, 2022, which is incorporated herein by reference.

TECHNICAL FIELD

The present invention relates to a biocompatible surgical ink that can be safely used in surgery and the like, a method for preparing the same ink, and a surgical pen using the same ink.

BACKGROUND ART

Conventionally, in a surgery such as an endoscopic surgery or an orthognathic surgery, a target site is marked using a coloring ink in order to accurately visually recognize an intended target site such as a follow-up part, a cut part, and an incision position on a surface of a living body such as a surface of a tissue or an organ such as skin, bone, or an organ.

In general, the marking work on the target site using a coloring ink is performed by a so-called "dipping pen type" of a dye ink stored in an ink pot and a dipping pen such as a bamboo stick as a surgical pen.

Specifically, after a certain amount of dye ink is stored by immersing a pen tip in a dye ink in an ink pot, a writing operation is performed with a dipping pen so as to draw a line or a mark on the target site so as to apply ink that drips from the pen tip, and when the dye ink is insufficient, a replenishing operation is performed in which the pen tip is inserted into the ink pot again to replenish the ink.

That is, in the marking of the "dipping pen type", it is essential to alternately repeat the ink replenishing operation and the writing operation, and in order to prevent the target site from being inadvertently damaged at the time of writing operation, it is necessary to always slightly float the pen tip from the target site or not to apply too much force, which has made the marking work complicated and difficult.

In addition, since the target site to be marked is mostly in a wet state with tissue fluid such as blood or saliva, and the dye ink is basically water-soluble containing crystal violet as a main component, the applied dye ink immediately diffuses and smears in the tissue fluid, and consequently, the ink does not remain at the target site, and there has been a problem that accurate marking is not provided.

For this problem, in order to improve the accuracy and workability of the marking work, for example, a dye ink to which a volatile agent such as benzine alcohol or ethanol is added (see, for example, Patent Literature 1.), a pigment ink to which a water-soluble organic solvent is added, a surgical pen using the same (see, for example, Patent Literature 2.) and the like have been proposed.

CITATION LIST

Patent Literature

Patent Literature 1: JP 10-194998 A
Patent Literature 2: JP 2007-262062 A

SUMMARY OF INVENTION

Technical Problem

In recent years, it has been pointed out that crystal violet, which is a main component of dye ink, exhibits carcinogenicity to living bodies, and it is prohibited to launch crystal violet for surgical marker use overseas due to safety problems.

In response to this, in Japan, there is currently a movement to stop the production of dye ink containing crystal violet as a main component, and in the medical world and the like, there is a demand for the development of a new surgical ink that can be safely used for living bodies instead of the dye ink and a surgical pen that improves workability.

In addition, medical devices such as surgical inks and surgical pens are required to implement "sterilization validation (JIS T 0806-1/ISO 11137-1)" in order to ensure safety in market distribution, and it is required to constantly guarantee sterility as a product by γ-ray irradiation at a constant dose.

According to the surgical ink according to Patent Literature 1, the volatilization effect of the ink at the target site is enhanced by mixing a resin material, a volatilization agent, and a colorant to improve fixability of the ink. However, this surgical ink employs methylrosanilinium chloride, that is, crystal violet as the colorant, and thus there remains a problem in safety.

In this regard, according to Patent Literature 2, although a pigment ink using a carbon powder is used as the surgical ink, sterility in accordance with "sterilization validation" is not guaranteed, and furthermore, a surgical pen considering writing property in relation to the pigment ink is not disclosed.

That is, although the pigment ink according to Patent Literature 2 is disclosed for a general autoclave sterilization treatment, the pigment ink is not prepared in consideration of a γ-ray irradiation sterilization treatment that guarantees a higher level of sterility.

If the ink is irradiated with γ-rays, the properties of the ink such as the viscosity of the ink and the average particle diameter of the pigment may be modified depending on the absorbed dose, which may cause a problem in writing property.

Furthermore, regarding the surgical pen according to Patent Literature 2, only an aspect of filling a syringe with a pigment ink and injecting the pigment ink into a target site is disclosed, and it is not an aspect as a medical device, and it is not in consideration of writing convenience such as stably discharging the pigment ink or improving the writing operation as well as the problem of deterioration due to the γ-ray irradiation sterilization treatment in accordance with the sterilization validation.

The present invention has been made in view of such problems, and an object of the present invention is to provide a surgical ink that is suitable for medical devices that ensure safety in accordance with the sterilization validation and can be widely distributed on the market, and has biocompatibility and writing property, a method for preparing the same ink, and a surgical pen having good writing convenience.

Solution to Problem

In order to solve the above conventional problems, the surgical ink according to the present invention has the following features.

(1) A biocompatible surgical ink containing an activated carbon powder and a water-soluble organic solvent, contains 60 to 80 parts by weight of a dispersion liquid containing 8 to 10 wt % of the activated carbon powder, 5 to 7 wt % of a water-soluble polymer, 0.01 to 1.00 wt % of sodium hydroxide, and water as a residue, and 5 to 25 parts by weight of the water-soluble organic solvent, and has a pH of 4 to 11, an average particle diameter of 150 to 310 nm, and a viscosity of 2.0 to 8.0 mPa's after irradiation with γ-rays of 25 kGy to 70 kGy.

(2) The water-soluble polymer is polyvinylpyrrolidone, and the water-soluble organic solvent is propylene glycol.

In addition, the surgical pen according to the present invention includes a cylindrical shaft body portion having a storage part for the surgical ink, and a pen tip portion for discharging the ink at a distal end of the shaft body portion, and has the following features.

(3) The pen tip portion is made of a synthetic resin, and has a bending strength of 1.0 N or more after irradiation with γ-rays of 25 kGy to 70 kGy.

(4) The surgical ink is the ink according to (1) or (2).

(5) The surgical ink is stored in the storage part in a state of being impregnated in a wadding portion, and the wadding portion is communicably connected to a base end of the pen tip portion at a distal end.

(6) The shaft body portion includes a holder for writing operation at a tail end part, and the holder has a bulging part bulging outward from the tail end of the shaft body portion.

(7) The holder includes a second bulging part that covers and bulges an outer peripheral surface of a rear half portion of the shaft body portion, and has a constricted shape together with the bulging part and the second bulging part.

(8) The surgical pen includes a cap body attachable to and detachable from a distal end portion of the shaft body portion, and the shaft body portion has a pen tip receiving part which is formed at the distal end portion and is used to mount and fix the pen tip portion, and the cap body includes the pen tip portion in a state of being mounted on the shaft body portion, and has a pressure-bonded surface portion that is crimped into engagement with an outer peripheral wall portion of the pen tip receiving part on an inner peripheral surface portion.

(9) The cap body includes an outer cap and an inner cap arranged inside the outer cap, and the inner cap has a bottomed cylindrical cap main body part having the pressure-bonded surface portion on an inner peripheral surface portion, and a leaf spring part that has a constant gap with an outer peripheral surface of the cap main body part and is bent outward from an opening of the cap main body part and extends, and the inner cap is inserted and fitted to the outer cap with an opening direction being the same as an opening of the outer cap, and is crimped and fixed to the inner peripheral surface of the outer cap via the leaf spring part.

Furthermore, the present invention also provides (10) a method for preparing a surgical ink, including: a dispersion liquid preparation step of adding 8 to 10 wt % of activated carbon powder, 5 to 7 wt % of a water-soluble polymer, 0.01 to 1.00 wt % of sodium hydroxide, and water as a residue, and mixing and stirring the mixture to obtain a dispersion liquid; an ink composition preparation step of adding 5 to 25 parts by weight of propylene glycol as a water-soluble organic solvent to 60 to 80 parts by weight of the dispersion liquid, and mixing and stirring the mixture to obtain an ink composition; and a sterilized ink preparation step of irradiating the ink composition with γ-rays of 25 kGy to 70 kGy to obtain a surgical ink having a pH of 4 to 11, an average particle diameter of 150 to 310 nm, and a viscosity of 2.0 to 8.0 mPa·s.

Advantageous Effects of Invention

According to the surgical ink according to the present invention, there is provided a biocompatible surgical ink containing an activated carbon powder and a water-soluble organic solvent, containing 60 to 80 parts by weight of a dispersion liquid containing 8 to 10 wt % of the activated carbon powder, 5 to 7 wt % of a water-soluble polymer, 0.01 to 1.00 wt % of sodium hydroxide, and water as a residue, and 5 to 25 parts by weight of the water-soluble organic solvent, and having a pH of 4 to 11, an average particle diameter of 150 to 310 nm, and a viscosity of 2.0 to 8.0 mPa·s after irradiation with a γ-ray of 25 kGy to 70 kGy, and thus it is possible to improve the efficiency of marking work by improving writing property while ensuring safety in accordance with the sterilization validation.

That is, it is possible to stabilize properties of the ink such as temporal stability of the ink and dispersibility of pigment powder even after irradiation with a sterilization dose of γ-rays in accordance with the sterilization validation as a medical device member, and it is possible to suppress adverse effects on the body such as toxicity as much as possible even if there is an inadvertent residue of the drug due to exhibiting biocompatibility.

In addition, since the viscosity after the γ-ray irradiation sterilization treatment is stable, the fixability is improved without smearing at the target site in a wet state, and there is an effect that stable writing property can be realized.

Also, if the water-soluble polymer is polyvinylpyrrolidone and the water-soluble organic solvent is propylene glycol, there is an effect that not only biocompatibility is exhibited, but also good adhesion to a target site in a wet state is exhibited, and dispersibility of the activated carbon powder can be further enhanced to prepare a good ink.

Moreover, according to the surgical pen of the present invention, there is provided a surgical pen having radiation resistance, including a cylindrical shaft body portion having a storage part for a surgical ink; and a pen tip portion for discharging the ink at a distal end of the shaft body portion, in which the pen tip portion is made of a synthetic resin, and has a bending strength of 1.0 N or more after irradiation with γ-rays of 25 kGy to 70 kGy, and thus the surgical ink stored inside the shaft body portion can be stably discharged from the pen tip by a capillary phenomenon, and even if a writing operation is performed by directly sliding the pen tip at a target site such as a weak tissue or organ, the target site is not inadvertently damaged. Therefore, there is an effect that correct marking can be easily performed and writing convenience can be improved.

Further, if the surgical ink is the ink according to claim 1 or 2, there is an effect that writing can be performed in which the fixability on a wet surface of a living body is improved at the time of writing operation while dischargeability and outflow properties of the ink are stabilized even after the γ-ray irradiation sterilization treatment.

Furthermore, if the surgical ink is stored in the storage part in a state of being impregnated in a wadding portion, and the wadding portion communicates with a rear end portion of the pen tip portion, there are effects that the ink is prevented from inadvertently leaking from the shaft body due to a change in the external environment such as atmospheric pressure or temperature, and the temporal stability of the surgical pen can be improved.

In addition, if a holder for writing operation is provided at a tail end part of the shaft body portion, and the holder has a bulging part bulging outward from the tail end of the shaft body portion, there are effects that it is possible to stably perform a finger-pinching writing operation in which the tail end part of the pen is pinched with fingers and the pen tip portion is placed on the target site of the surface of a living body through the holder for drawing, and the damage risk can be reduced without applying unnecessary writing pressure stress on the surface of a living body as compared with a normal writing operation performed by gripping a body part of the pen.

Moreover, if the holder has a second bulging part that covers and bulges an outer peripheral surface of a rear half portion of the shaft body portion, and has a constricted shape together with the bulging part and the second bulging part, there is an effect that it is possible to further stabilize the finger-pinching writing operation using the constricted portion between the bulging part and the second bulging part as a pinching position and using the pinching position as a fulcrum.

Further, if a cap body attachable to and detachable from a distal end portion of the shaft body portion is provided, the shaft body portion has a pen tip receiving part which is formed at the distal end portion and is used to mount and fix the pen tip portion, and the cap body includes the pen tip portion in a state of being mounted on the shaft body portion, and has a pressure-bonded surface portion that is crimped into engagement with an outer peripheral wall portion of the pen tip receiving part on an inner peripheral surface portion, it is possible to reduce as much as possible the volume of the internal space of the pen tip portion which is engaged with the pen tip receiving part of the shaft body portion by the pressure-bonded surface portion and blocked from the outside in the cap body. This improves the effect of preventing the ink from volatilizing and drying at the pen tip portion, and has an effect that the dischargeability of the ink can be prevented from being lowered.

Furthermore, if the cap body includes an outer cap and an inner cap arranged inside the outer cap, and the inner cap has a bottomed cylindrical cap main body part having the pressure-bonded surface portion on an inner peripheral surface portion, and a leaf spring part that has a constant gap with an outer peripheral surface of the cap main body part and is bent outward from an opening of the cap main body part and extends, and the inner cap is inserted and fitted to the outer cap with an opening direction being the same as an opening of the outer cap, and is crimped and fixed to the inner peripheral surface of the outer cap via the leaf spring part, the cap main body part is always energized in a cylindrical axial center direction by the leaf spring part, thus there is an effect that when a lid is closed with the cap body, the pressure-bonding property of the pressure-bonded surface portion formed on the inner peripheral surface portion of the inner cap to the outer peripheral wall portion of the pen tip receiving part is improved so that the anti-volatilization effect can be further enhanced.

BRIEF DESCRIPTION OF DRAWINGS

FIG. 10 is a view showing the thigh muscle after a lapse of 14 days of a rat on which the writing was performed using the surgical pen a.

DESCRIPTION OF EMBODIMENTS

Figure 1:
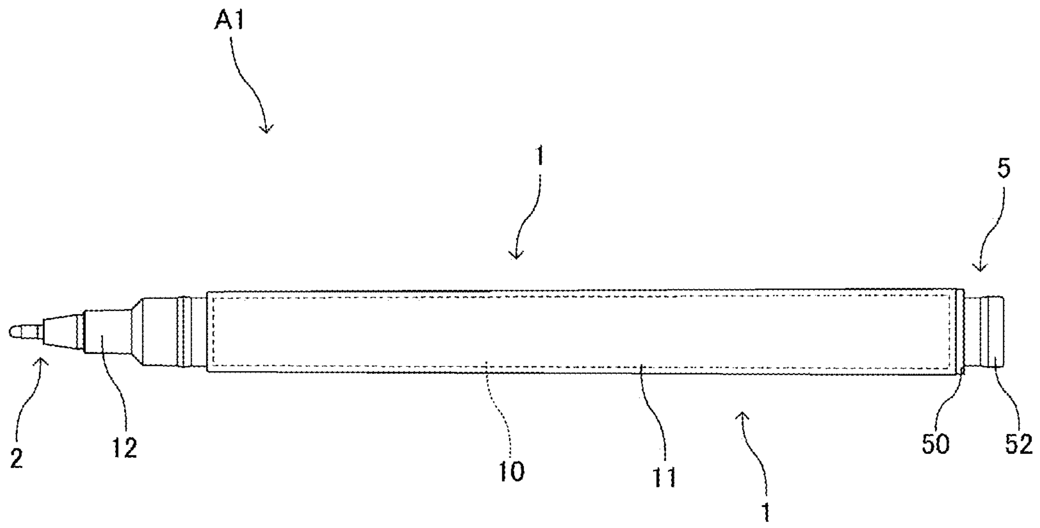
FIG. 1 is an external side view and an exploded perspective view showing a configuration of a surgical pen according to a first embodiment.
Figure 1:
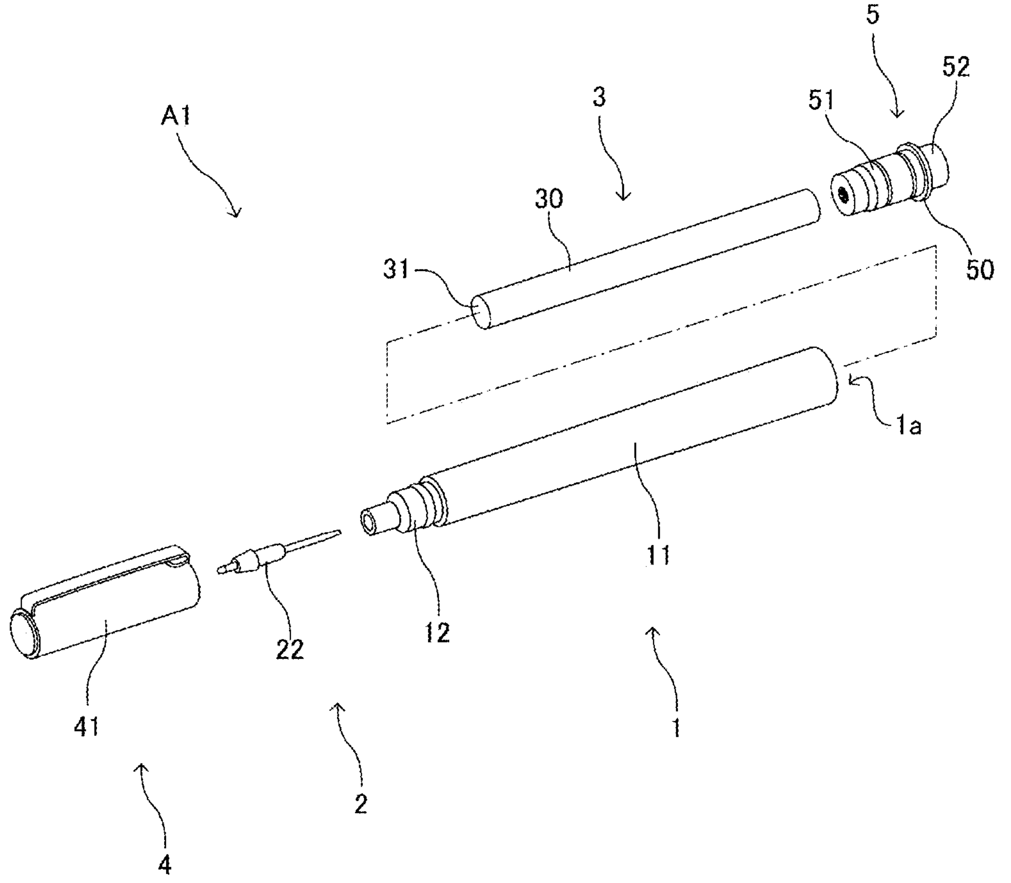

The surgical ink (hereinafter, simply referred to as the ink.) according to the present invention is a biocompatible surgical ink containing an activated carbon powder and a water-soluble organic solvent, containing 60 to 80 parts by weight of a dispersion liquid containing 8 to 10 wt % of the activated carbon powder, 5 to 7 wt % of a water-soluble polymer, 0.01 to 1.00 wt % of sodium hydroxide, and water as a residue, and 5 to 25 parts by weight of the water-soluble organic solvent, and having a pH of 4 to 11, an average particle diameter of 150 to 310 nm, and a viscosity of 2.0 to 8.0 mPa·s after irradiation with γ-rays of 25 kGy to 70 kGy.

Further, the present invention provides a surgical pen having radiation resistance, including a cylindrical shaft body portion having a storage part for a surgical ink; and a pen tip portion for discharging the ink at a distal end of the shaft body portion, in which the pen tip portion is made of a synthetic resin, and has a bending strength of 1.0 N or more after irradiation with γ-rays of 25 kGy to 70 kGy.

Furthermore, the present invention also provides a method for preparing a surgical ink, including: a dispersion liquid preparation step of adding 8 to 10 wt % of activated carbon powder, 5 to 7 wt % of a water-soluble polymer, 0.01 to 1.00 wt % of sodium hydroxide, and water as a residue, and mixing and stirring the mixture to obtain a dispersion liquid; an ink composition preparation step of adding 5 to 25 parts by weight of propylene glycol as a water-soluble organic solvent to 60 to 80 parts by weight of the dispersion liquid, and mixing and stirring the mixture to obtain an ink composition; and a sterilized ink preparation step of irradiating the ink composition with γ-rays of 25 kGy to 70 kGy to obtain a surgical ink having a pH of 4 to 11, an average particle diameter of 150 to 310 nm, and a viscosity of 2.0 to 8.0 mPa·s.

In Japan, the "standard for sterilization validation" necessary for manufacturing management and quality control of medical devices has been established, and the treatment conditions and the like have been repeatedly revised based on the accumulation of knowledge about various sterilization methods that secure sterility, such as radiation sterilization, electron beam sterilization, moist heat sterilization (high pressure steam sterilization), and ethylene oxide gas sterilization.

Among them, γ-ray irradiation sterilization can be performed at room temperature and has permeability as compared with other sterilization methods, and thus is less denatured due to residue of a drug, excessive pressure heating, or the like, and is optimal for commercially available medical devices in that even if there is a liquid contained in a product container or a sealed portion inside a product, an object to be sterilized can be sterilized while being packaged to secure high sterility.

In particular, the γ-ray irradiation sterilization is excellent in that it can be applied to single-use medical devices (disposable products) which are mainstream in hygiene control, and is applied to most disposable products distributed on the market today.

However, according to this γ-ray irradiation sterilization, radiation degradation of an object to be sterilized after irradiation with a sufficient sterilization dose is inevitable, and in order to avoid an inadvertent medical accident due to, for example, device damage during operation in an actual medical site, it has been an urgent problem to provide a medical device that maintains high quality even after the sterilization dose.

In addition, in the medical industry aiming at maintenance, recovery, and promotion of human health, medical treatment has been performed in consideration of the influence on living bodies as a top priority. In a case where it has been revealed that a medical device that has been used empirically so far has an adverse effect on a human body, use of the device has been promptly stopped and changed, thereby achieving the purpose of the medical industry.

The surgical ink according to the present invention and the surgical pen using the same are newly developed innovative inventions that improve visibility of the surgical field of the target site on the surface of a living body by having biocompatibility and improving writing property and writing convenience in order to quickly achieve the purpose of the medical industry as well as the safety by the new standard for sterilization validation that has been changed in view of the current situation.

Hereinafter, the present invention will be described in the following order.

<1. Components of surgical ink>:
<2. Method for preparing surgical ink>:
<3. Properties of surgical ink>:
<4. Configuration of surgical pen according to first embodiment>:
<5. Configuration of surgical pen according to second embodiment>:
<6. γ-Ray irradiation conditions>
<7. Examples of surgical ink>:
<8. Evaluation of functionality of surgical ink and surgical pen after γ-ray irradiation>:

1. Components of Surgical Ink

The present ink is a biocompatible ink containing an activated carbon powder and a water-soluble organic solvent, and maintains stable writing property while suppressing denaturation as much as possible while securing sterility by γ-ray irradiation in accordance with the sterilization validation according to the following blending composition.

[Dispersion Liquid (A)]

A dispersion liquid (A) of the ink contains an activated carbon powder (a), a water-soluble polymer (b), sodium hydroxide as a base substance (c), and water (d) as components (see, for example, Table 1 shown below), and is a base material of the ink that improves the biocompatibility, dispersibility, temporal stability, writing property, and the like of the ink after irradiation with γ-rays of 25 kGy to 70 kGy.

(Activated Carbon Powder (a))

The activated carbon powder (a) is used as a pigment of the present ink, and when the activated carbon powder (a) is refined through a refinement step by a pulverizer or the like, the color of the ink is made dark to improve colorability, and the dispersibility in the dispersion liquid is improved.

The physical properties of the activated carbon powder (a) used in the present ink are not particularly limited, but the activated carbon powder (a) preferably has an average particle diameter of 5 to 70 μm, a specific surface area of 1,000 to 2,000 $m^2/g$, a total pore volume of 0.5 to 3.0 ml/g, and an average pore diameter of 2 to 10 nm. Also, the activated carbon powder (a) of the present ink preferably has a pH of 4.5 to 7.5 and an iron content of 0.01 wt % or less.

In addition, the activated carbon powder (a) is composed of 0.5% or less of chloride (Cl), 0.5% or less of sulfate (SO4), 0.1% or less of zinc, and 4.0 μg/g or less of arsenic (As203), which meet the food additive standards. This prevents inadvertent influence on the physical properties of the ink without showing toxicity to the human body. The measurement of various parameters of the activated carbon powder (a) is performed by a method specified in JIS K 1474-91.

The content of the activated carbon powder (a) in the dispersion liquid (A) is 8 parts by weight to 10 parts by weight/100 parts by weight of the dispersion liquid. That is, the concentration of the activated carbon powder (a) in the dispersion liquid is 8 to 10 wt %. When the concentration is less than 8 wt %, the coloring density of the finally prepared ink becomes thin, and the marking performance on the writing object may be insufficient. On the other hand, when the concentration exceeds 10 wt %, the activated carbon powder is aggregated in the finally prepared ink, and the temporal stability of the ink and the dischargeability from the marking pen may be lowered.

More specifically, the coloring developability of the ink is secured by setting the blending amount of the activated carbon powder (a) in the ink to 0.1 wt % to 10 wt %, preferably 1 wt % to 5 wt %. When the blending amount is less than 0.1 wt %, the concentration is low, and when the blending amount exceeds 10 wt %, the aggregation reaction is promoted.

(Water-Soluble Polymer (b))

The water-soluble polymer (b) of the present ink is used not only as a dispersant capable of stabilizing the activated carbon powder (a) in the ink as a pigment in a finely dispersed state, but also as one exhibiting adhesiveness and biocompatibility to the surface of a living body in a wet state such as moisture and body fluid.

As the water-soluble polymer (b), nonpolar polymers such as hydroxypropyl cellulose (hereinafter, also referred to as HPC.), hydroxypropyl methyl cellulose (hereinafter, also referred to as HPMC.), and polyvinylpyrrolidone (hereinafter, also referred to as PVP.) are preferable. In particular, it is preferable to employ PVP as the water-soluble polymer (b) from the viewpoint of having wide biocompatibility as a food additive and having high dispersion performance in a coloring material.

When the water-soluble polymer (b) has a viscosity average molecular weight of less than 1,000, the ink cannot be fixed to the surface of a living body. On the other hand, when the water-soluble polymer (b) has a viscosity average molecular weight exceeding 220,000, the dischargeability of the ink from the surgical pen may be deteriorated. Therefore, the water-soluble polymer (b) preferably has a viscosity average molecular weight of 1,000 to 220,000.

The viscosity average molecular weight of the water-soluble polymer (b) is basically measured by the molecular weight measurement method described in Japanese journal of polymer science and technology vol. 38, No. 7, pp. 457-463 (July 1981). Specifically, the following procedures (1) and (2) are performed.

(1) A sample of the water-soluble polymer (b) is added to excess acetone to perform precipitation purification. This operation is repeated twice, followed by drying under reduced pressure until the acetone odor disappears.

(2) An aqueous solution of the sample of the water-soluble polymer (b) after purification is prepared, and the viscosity average molecular weight is determined using a Mark-Kuhn-Houwink equation (Mark-Houwink-Sakurada equation) using an Ubbelohde viscometer (water, 120 sec). As the coefficients M and a of the Mark-Kuhn-Houwink equation, those described in the Japanese journal of polymer science and technology are used. However, other methods may be used as long as the same result can be obtained. The numerical value of the molecular weight may vary by about 10% due to a measurement error or the like. Therefore, the upper and lower ranges of about 10% of the above-described numerical range may be used.

The content of the water-soluble polymer (b) in the dispersion liquid (A) is 5 to 7 parts by weight/100 parts by weight of the dispersion liquid. That is, the concentration of the water-soluble polymer (b) in the dispersion liquid is 5 to 7 wt %. When the concentration is less than 5 wt %, it is difficult to disperse the activated carbon powder (a) in the finally prepared ink, and the dispersed particle size increases, so that a clogging phenomenon may occur in the surgical pen. On the other hand, when the concentration exceeds 7 wt %, the viscosity of the finally prepared ink becomes too high, and the dischargeability from the surgical pen may be deteriorated.

More specifically, the blending amount of the water-soluble polymer (b) is 20 to 200 parts by weight, preferably 30 to 150 parts by weight based on 100 parts by weight of the activated carbon powder (a). When the blending amount is less than 20 wt %, the dispersibility of the carbon powder is deteriorated. On the other hand, when the blending amount exceeds 200 parts by weight, the dischargeability of the ink is deteriorated.

(Base Substance (c))

In the present invention, the base substance (c) can be present in the ink in order to prepare the pH within a predetermined range. In the ink composition of the present invention, since the ink tends to exhibit acidity due to the activated carbon powder (a), irritation to the living body may be strong depending on the site unless neutralization with the base substance (c) is performed. A suitable pH range varies depending on the site of the living body, but in the present invention, by appropriately adjusting the amount of the base substance added, the pH can be prepared to an appropriate range according to the site to be marked, and the irritation can be reduced.

The base substance (c) of the present invention is not particularly limited as long as it has biocompatibility among substances exhibiting basicity in the definition of Arrhenius, but base substances (c) such as sodium carbonate, sodium hydroxide, potassium carbonate, and sodium bicarbonate which can greatly change the pH by addition in a small amount and are recognized to be used as food additive applications are preferable.

In particular, sodium hydroxide is most suitable as the base substance (c). By adding sodium hydroxide, the dispersion state of particles in the ink is stabilized even with a hardly dispersible pigment such as activated carbon, and it is possible to prevent discharge failure such as clogging at the pen tip, deterioration, sedimentation, solidification, particle increase, and viscosity increase due to long-term storage, and the like. Although the mechanism by which sodium hydroxide contributes to the stabilization of the dispersed state is not clear, it is considered that the surface activity of the carbon material particles is stabilized and the effect of preventing aggregation is exhibited. Furthermore, it is easily decomposed in vivo, and can be safely used on the surfaces of tissues and organs such as skin, bone, and organs. Also, the viscosity of the ink can be stabilized to suppress re-aggregation of the pigment powder, and dispersibility can be improved.

The base substance (c) is contained in an amount of preferably 0.01 to 1.00 parts by weight, more preferably 0.05 to 0.50 parts by weight in 100 parts by weight of the ink. When the amount of the base substance is less than 0.01 parts by weight, the change in pH is insufficient, and in the case of using sodium hydroxide, the effect of stabilizing the dispersion state cannot be sufficiently exhibited. When the added amount is more than 1.00 part by weight, the pH may be higher than a range appropriate for a living body, and the irritation may be strong.

(Water (d))

The water (d) is used as a dispersion medium in preparing the dispersion liquid (A), and is a main component of the dispersion liquid A and the present ink, and can be an ink excellent in biocompatibility, safety, and operability. As the water (d), distilled water, water for injection, or the like whose quality is appropriately controlled for medical use is preferably employed.

The content of the water (d) in the dispersion liquid (A) is preferably 70 parts by weight to 90 parts by weight/100 parts by weight of the dispersion liquid A. When the content is less than 70 parts by weight, the concentration of the other components becomes relatively high, and when the content is more than 90 parts by weight, the concentration of the other components becomes relatively low, and the dispersion liquid A may not correctly function as the base material of the ink in either case.

As will be described in detail later, the present ink contains water as a main component by setting the final moisture content to 50 wt % or more, preferably 60 wt % or more. That is, in the present ink, the liquid component other than a specific water-soluble organic solvent (B) described below is substantially water. As a result, not only biocompatibility can be secured, but also the degree of modification such as crosslinking of the water-soluble polymer in the ink can be suppressed as much as possible even after γ-ray irradiation.

[Water-Soluble Organic Solvent (B)]

The water-soluble organic solvent (B) is used to improve the viscosity of the ink and fixability on the surface of a living body after γ-ray irradiation, and is not particularly limited as long as it exhibits specific viscosity and biocompatibility.

As the water-soluble organic solvent (B), alcohols such as methanol, ethanol, n-propanol, isopropanol, n-butanol, isobutanol, t-butanol, trimethylolpropane, ethylene glycol monoethyl ether, ethylene glycol monobutyl ether, monoethylene glycol, diethylene glycol, triethylene glycol, and polyethylene glycol can be employed. Among them, ethanol, isopropanol, glycerin, and polyethylene glycol (hereinafter, also referred to as PG.), which are approved as food additives, are particularly preferably employed.

When the content of the water-soluble organic solvent (B) in the ink is 5 to 25 parts by weight/100 parts by weight of the ink, the fixability on the surface of a living body and the dischargeability of the ink from the surgical pen after γ-ray irradiation are improved. When the content is less than 5 parts by weight, the viscosity of the ink may be low and inadvertent ink leakage from the surgical pen may occur. In addition, when the content is more than 25 parts by weight, the viscosity may be too high, and the dischargeability from the surgical pen may be deteriorated.

The water-soluble organic solvent (B) is not necessarily an essential component as the composition of the present ink, and is selectively added according to the type of surgical pen described later. Therefore, when the water-soluble organic solvent (B) is ethanol-free in which ethanol is not added, the irritation can be lowered.

[Surface Tension Preparing Agent (C)]

Furthermore, a predetermined amount of a surface tension preparing agent (C) may be added to the present ink as necessary. The surface tension preparing agent (C) is a component having a function of improving discharge from a pen core and preparing surface tension.

As the surface tension preparing agent (C), for example, a surfactant such as anionic, nonionic, silicone-based, fluorine-based, a water-soluble organic solvent such as ethanol or isopropanol, or the like can be employed. Examples of the anionic surfactant include alkylbenzene sulfonates, higher alcohol sulfuric ester salts, higher fatty acid salts, higher alkyl carboxylates, alkyl naphthalene sulfonates, alkyl sulfosuccinates, naphthalenesulfonic acid formalin condensate salts, polyoxyethylene alkyl ether sulfates, and polyoxyethylene alkyl phosphoric acid esters. Examples of the nonionic surfactant include polyoxyethylene alkyl ethers, polyoxyethylene alkylphenyl ethers, fatty acid monoglycerides, sorbitan fatty acid esters, sucrose fatty acid esters, polyoxyethylene sorbitan fatty acid esters, polyoxyethylene fatty acid esters, glycerin fatty acid esters, and polyoxyethylene-added acetylene glycol.

2. Method for Preparing Surgical Ink

The surgical ink according to the present invention is prepared by mixing the above-described components at a predetermined blending ratio. That is, the present ink is formed by mixing 60 to 80 parts by weight of the dispersion liquid (A) having the above blending composition and 5 to 25 parts by weight of the water-soluble organic solvent (B) (see, for example, Table 3 shown below).

When the amount of the dispersion liquid (A) is less than 60 parts by weight or the amount of the water-soluble organic solvent (B) is less than 5 parts by weight, the dispersibility of the activated carbon powder (a) or the adhesiveness (fixability) at the target site may be deteriorated. On the other hand, when the amount of the dispersion liquid (A) exceeds 80 parts by weight or the amount of the water-soluble organic solvent (B) exceeds 25 parts by weight, continuous and stable writing convenience may be deteriorated, for example, clogging occurs at the pen tip portion of the surgical pen or discharge becomes difficult due to an excessively high viscosity.

In preparing the ink of the present invention, the mixing method of the components described above is not particularly limited. For example, the activated carbon powder (a), the water-soluble polymer (b), the sodium hydroxide (c), and the water (d), which are components of the dispersion liquid (A), and the water-soluble organic solvent (B) may be mixed and stirred. In the preparation of the ink, it is preferable to prepare the dispersion liquid (A), then add the water-soluble organic solvent (B) thereto and stir the mixture in that the activated carbon powder (a) can be favorably dispersed in the ink.

That is, the method for preparing the present ink includes a dispersion liquid preparation step S1 of obtaining a dispersion liquid (A) and an ink composition preparation step S2 of obtaining an ink composition.

In the dispersion liquid preparation step S1, 8 to 10 parts by weight of the activated carbon powder (a), 5 to 7 parts by weight of the water-soluble polymer (b), 0.01 to 1.00 part by weight of the base substance (c), and 70 to 90 parts by weight of water as a residue are mixed and stirred to prepare a dispersion liquid (A). The activated carbon powder (a) can be stably dispersed in water by using a disperser (for example, a paint shaker, a roll mill, a ball mill, a sand mill, a jet mill, or the like) for stirring.

Before the dispersion liquid preparation step S1, a refinement strengthening step S0 of strengthening refinement of the activated carbon powder by a sand mill or the like may be included before blending the components. That is, it is possible to obtain an activated carbon powder in which the average particle diameter and the average pore diameter are adjusted by the refining treatment time of a sand mill or the like.

In the ink composition preparation step S2, 5 to 25 parts by weight of the water-soluble organic solvent (B), and water or the surface tension preparing agent (C) as a residue are added to 60 to 80 parts by weight of the dispersion liquid (A) obtained in the dispersion liquid preparation step S1 to have a total weight of 100 parts by weight, and the mixture is mixed and stirred to prepare an ink composition. The amount of the surface tension preparing agent (C) added is 5 to 15 parts by weight for each.

The dispersion liquid preparation step S1 and the ink composition preparation step S2 may include before and after or in the middle of the steps a coarse particle removal step S3 of removing coarse particles of the activated carbon powder (a) by filtering the coarse particles with a filter or the like or classifying the coarse particles with a centrifuge. Further, after the ink composition preparation step S2, an ink filling step S5 of filling the obtained ink composition in the surgical pen of the present invention described later can be performed.

Furthermore, the method for preparing the present ink includes a sterilized ink preparation step S4 of irradiating γ-rays to secure sterility. The sterilized ink preparation step S4 is a step of irradiating the ink composition passed through the ink composition preparation step S2, the coarse particle removal step S3, and the ink filling step S5 with γ-rays of 25 kGy to 70 kGy to finally obtain the surgical ink according to the present invention. The γ-ray irradiation conditions and the like are in accordance with <5. γ-Ray irradiation conditions> described later.

That is, the ink composition becomes a surgical ink in which sterility is secured and writing property and dispersibility are improved by passing through the sterilized ink preparation step S4, and can be safely distributed to the market as a specific medical device. When the ink filling step S5 is interposed, the sterilized ink preparation step S4 is performed integrally with the surgical pen.

That is, the sterilized ink preparation step S4 is performed after the ink composition is prepared by the ink composition preparation step S2. The sterilized ink preparation step S4 may be performed by storing the ink composition obtained in the ink composition preparation step S2 in a container having γ-ray resistance such as a poly container and performing γ-ray irradiation, or may be performed after filling the ink composition in an arbitrary pen to obtain a surgical pen. The ink composition is basically impregnated in a wadding portion 3 of a surgical pen A1 and stored in a storage part 10, and is subjected to a γ-ray irradiation treatment to become a surgical ink in which sterility as a medical device is guaranteed (see FIG. 1(*b*) described later).

3. Properties of Surgical Ink

Next, the properties of the ink composition and the surgical ink before and after the sterilized ink preparation step S4, that is, before and after γ-ray irradiation of 25 kGy to 70 kGy will be described. The surgical ink prepared as described above reduces the change rates of various parameters such as viscosity (mPa·s), pH, and average particle size (nm) as much as possible as properties before and after γ-ray irradiation.

That is, the present ink is characterized in having a pH of 4 to 11, an average particle diameter of 150 to 310 nm, and a viscosity of 2.0 to 8.0 mPa's for the properties after irradiation with γ-rays of 25 kGy to 70 kGy. Methods for measuring various parameters indicating physical properties before and after γ-ray irradiation are as follows.

Viscosity Measurement
- Conditioning: stock solution
- Measuring instrument: cone plate rotational viscometer ("TVE-20L type" manufactured by Toki Sangyo Co., Ltd.)
- Measurement conditions: 50 rpm
- Measurement temperature: 25° C.

pH Measurement
- Conditioning: stock solution
- Measuring instrument: pH meter ("MH-41X type" manufactured by DKK-TOA CORPORATION)
- Measurement temperature: 25° C.

Measurement of Average Particle Size
- Conditioning: The stock solution is diluted with ion-exchanged water so as to fall within a predetermined measured concentration region.
- Measuring instrument: Dynamic light scattering particle size distribution measuring device ("NIKKISO: Microlracwave-EX150")
- Measurement time: 120 sec As changes in properties of the surgical ink before and after γ-ray irradiation at 25 kGy to 70 kGy, the viscosity is 4.9 to 5.7 mPa's for the ink composition before γ-ray irradiation and 2.0 to 8.0 mPa's for the ink after γ-ray irradiation, and the rate of change in viscosity before and after γ-ray irradiation is about 1.0% to 10.0%.

In addition, the pH of the ink composition before γ-ray irradiation is 8.7 to 8.8, and the pH of the ink after γ-ray irradiation is 4 to 11, so that a stable pH is maintained. Further, the average particle size is 240 to 285 nm for the ink composition before γ-ray irradiation and 150 to 310 nm for the ink after γ-ray irradiation, so that stable dispersibility is maintained.

The ink configured as described above can be safely used for the marking work of a so-called "dipping pen type" together with a dipping pen such as a bamboo comb, a bamboo stick, or the like by being stored in an ink pot as conventional, and the writing property is improved. Furthermore, by using the present ink in the surgical pen of the present invention, writing convenience can be improved by improving the dischargeability.

4. Configuration of Surgical Pen According to First Embodiment

Next, a configuration of a surgical pen according to a first embodiment of the present invention will be described. FIG. 1 is an external side view and an exploded perspective view showing the configuration of the surgical pen according to the present embodiment, FIG. 2(*a*) and FIG. 2(*b*) are a side sectional view and a partially enlarged sectional view showing the configuration of the surgical pen in a state where a cap body according to the present embodiment is removed, FIG. 2(*c*) is a side sectional view showing a configuration of the cap body according to the present embodiment, and FIG. 3 is a side sectional view and a partially enlarged sectional view showing the configuration of the surgical pen in a state where the cap body according to the present embodiment is mounted.

The surgical pen A1 according to the present embodiment has radiation resistance, and stores the above-described surgical ink to be configured to be writable. As schematically shown in FIGS. 1(*a*) and 1(*b*), the surgical pen A1 includes a cylindrical shaft body portion 1 having the storage part 10 for the surgical ink, and a pen tip portion 2 for discharging the ink at a distal end of the shaft body portion 1.

The material of the surgical pen A1 is not particularly limited as long as it is a radiation-resistant material that undergoes denaturation when irradiated with γ-rays at a prescribed sterilization dose of 25 kGy to 70 kGy, so that mechanical strength is reduced and vulnerability is not exposed early. Such a radiation-resistant material may be, for example, a metal material or a resin material. By using the resin material, mass productivity and economic efficiency of surgical pen are improved.

The resin material, for example, polypropylene (PP), high-density polyethylene (HDPE), polyethylene terephthalate (PET), polyether ether ketone (PEEK), or ABS, or the metal material, for example, copper, iron, aluminum, or stainless steel can be appropriately selected and employed as the radiation-resistant material for each constituent member of the surgical pen A1.

As shown in FIGS. 1(*a*) to 2(*b*), the shaft body portion 1 has an elongated cylindrical shape, an inner space of a body part 11 corresponding to most of the shaft body portion 1 is defined as the storage part 10, and a pen tip receiving part 12 for mounting and fixing the pen tip portion 2 is formed at the distal end portion in a tapered shape by reducing an outer inner diameter of the shaft body portion 1 as compared with the body part 11. The shaft body portion 1 of the present embodiment is made of PP.

The storage part 10 is a space portion that stores a certain amount of ink, and in the present embodiment, indirectly stores the ink through the wadding portion 3.

That is, the surgical pen A1 is configured as a so-called wadding type pen in which the surgical ink is impregnated in the wadding portion 3 and stored in the storage part 10, and the wadding portion 3 is communicably connected to a base end of the pen tip portion 2 at a distal end. The surgical pen A1 may be configured as a direct liquid type pen by directly storing ink in the storage part 10.

The wadding portion 3 has a cylindrical rod shape having substantially the same length as the body part 11 of the shaft body portion 1, and includes a cylindrical outer sheath 30 and a resin-fiber cotton main body 31 stored evenly throughout the inside of the outer sheath 30, so that the ink can be impregnated and held in the cotton main body 31.

In the wadding portion 3 of the present embodiment, the outer sheath 30 is made of PP, and the cotton main body 31 is made of PET. As a result, it is possible to prevent the ink from inadvertently leaking from the shaft body portion 1 due to a change in the external environment such as temperature and atmospheric pressure, and the temporal stability of the surgical pen can be improved.

Figure 2:
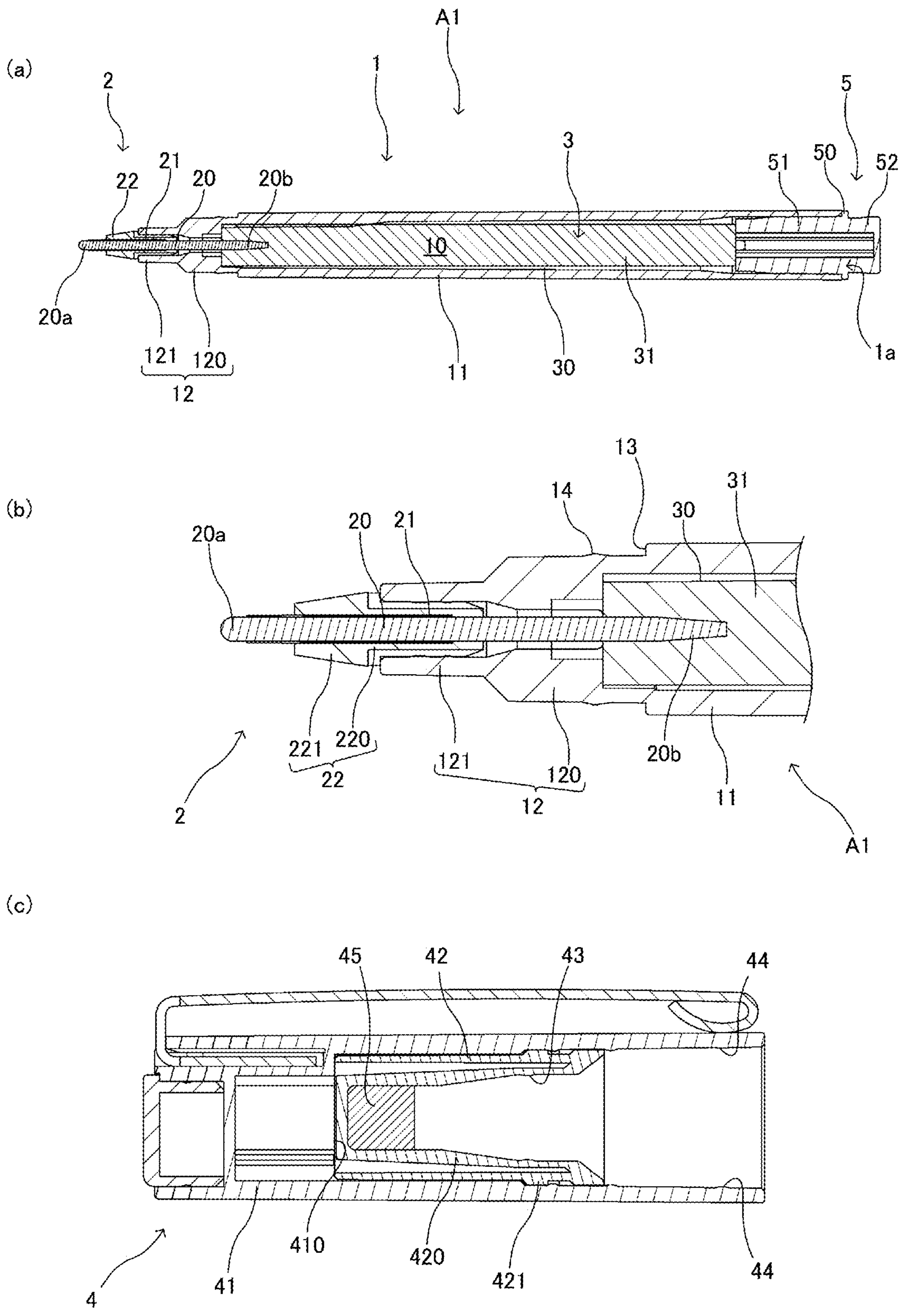
FIG. 2 is a side sectional view and a partially enlarged sectional view showing the configuration of the surgical pen according to the first embodiment.
Figure 3:
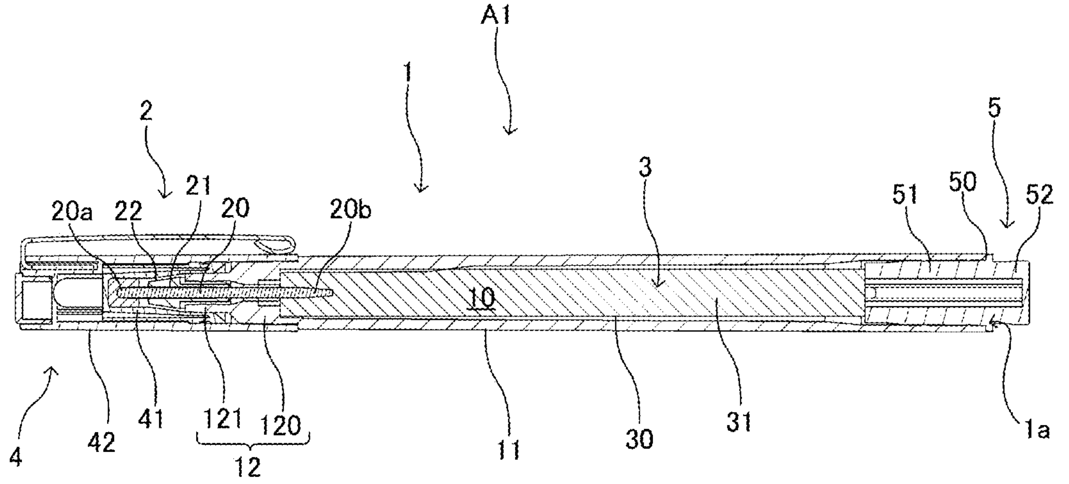
FIG. 3 is a side sectional view and a partially enlarged sectional view showing the configuration of the surgical pen according to the first embodiment in a state in which a cap body is mounted.
Figure 3:
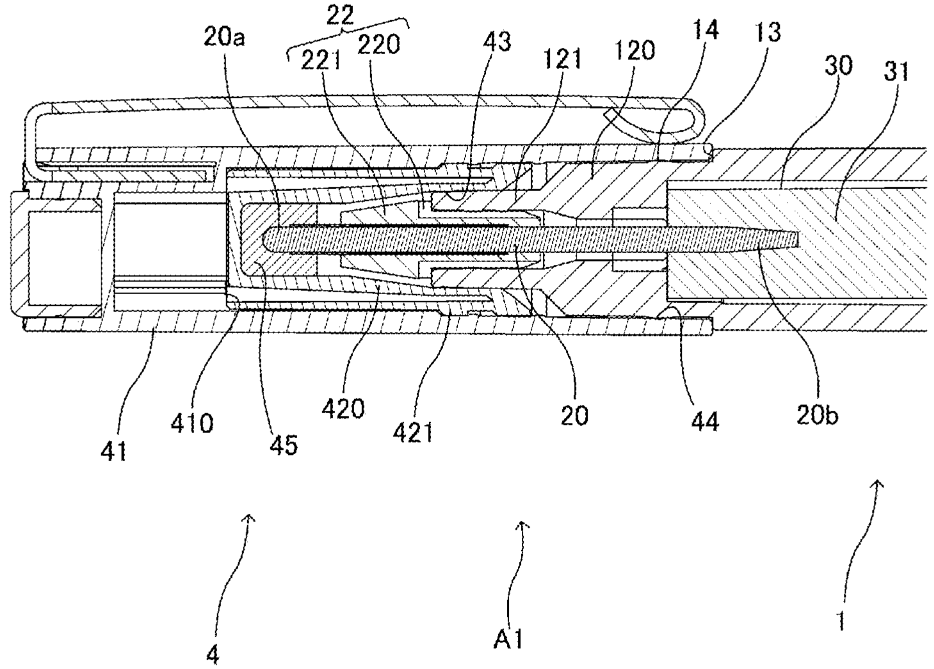

As shown in FIGS. 2(*a*) and 2(*b*), the pen tip receiving part 12 includes a distal end support part 120 whose diameter is reduced from that of the body part 11 in the distal end direction, and a distal end fitting part 121 whose diameter is further reduced on the distal end side from the distal end support part 120.

The distal end fitting part 121 is a part to which the pen tip portion 2 to be described later is press-fitted and fixed, has an opening end surface as a flat surface orthogonal to the axial direction, and is formed on an abutting engagement surface abutting on a chip 22 of the pen tip portion 2 to be described later.

In addition, a cap stopper step part 13 that faces and abuts on an opening end edge part of a cap body 4 described later is formed at a boundary between the body part 11 and the distal end support part 120 of the pen tip receiving part 12.

Also, on the peripheral wall of the distal end support part 120 of the pen tip receiving part 12, a flange part 14 for hooking the cap body 4 described later is formed so as to protrude radially outward.

Further, as shown in FIGS. 1(*a*) to 2(*a*), a tail plug 5 for closing a tail end side opening 1*a* of the shaft body portion 1 is provided at the tail end part of the shaft body portion 1.

As shown in FIG. 2(*a*), the tail plug 5 has a bottomed cylindrical shape, and includes a flange part 50 that faces and abuts on a peripheral edge portion of the tail end side opening 1*a* of the shaft body portion 1 at an axially middle portion of the body part 11, an insertion fitting portion 51 that is inserted and fitted into the shaft body portion 1 on a distal end side in the axial direction of the shaft body portion 1 with the flange part 50 as a boundary, and a fitting protrusion portion 52 that protrudes outward on the tail end side in the axial direction of the shaft body portion 1 and is fitted into the cap body 4. The tail plug 5 of the present embodiment is made of PP similarly to the shaft body portion 1.

In addition, the tail plug 5 and the shaft body portion 1 are configured via engaging means that is male and female engaged with each other. The engaging means includes an engaging recess provided on the outer peripheral surface of the insertion fitting portion 51 of the tail plug 5 and an engaging protrusion provided on the inner peripheral surface of the shaft body portion 1 so as to engage with the engaging recess.

The tail plug 5 having such a configuration has a relatively larger weight than other members, and thus functions as a plumb bob. That is, the surgical pen A1 is configured such that the center of gravity is eccentric from the axial center to the tail end side by the tail plug 5.

As a result, in a case where the writing target is a weak surface of a living body, it is possible to stably perform a finger-pinching writing operation of pinching the tail end part of the pen with each fingertip such as the cushions of the thumb and the index finger or the tail end part with the cushions of the thumb and the middle finger and placing the pen tip portion on the target site of the surface of a living body for drawing.

As shown in FIG. 2(*b*), the pen tip portion 2 includes a center core 20 made of a flexible resin fiber bundle, a thin cylindrical pipe 21 that exposes the distal end portion of the center core 20 and covers a front half middle portion in the axial direction of the center core 20 on the outer peripheral side, and a chip 22 that exposes the distal end portion of the pipe 21 and covers the front half middle portion in the axial direction of the center core 20 together with the pipe 21.

The center core 20 is formed into a fiber bundle in which fibers of polyethylene terephthalate (PET) or polyether ether ketone (PEEK) as a resin material are bound by urethane as a binder while gaps are provided between the fibers, and the ink stored in the storage part 10 of the shaft body portion 1 can flow out to the distal end side by a capillary phenomenon through the gaps.

Specifically, the pen tip portion 2 (center core 20) is made of a fiber bundle having a porosity of 52 to 60%. If the porosity of the pen tip center core is less than 52%, the dischargeability of the ink filled in the storage part 10 may be lowered and the writing property may be deteriorated. On the other hand, if the porosity exceeds 60%, ink leakage may occur when the pen is not used.

Further, the distal end of the center core 20 is a pen tip main body portion 20*a* that abuts on the surface of a living body to flow out the ink, and is configured to be sliding writable according to the writing direction and the writing angle. The pen tip main body portion 20*a* is formed as an exposed portion on the distal end side of the pipe 21 externally fitted and fixed in the center core 20.

That is, the pipe 21 is externally fitted and fixed to the base end side of the pen tip main body portion 20*a*, and the distal end strength of the pen tip main body portion 20*a* is improved as much as possible. The pipe 21 of the present embodiment is made of stainless steel (SUS).

The shape of the center core 20 of the present embodiment is configured to a rod-like body, and the distal end surface of the pen tip main body portion 20*a* that performs writing is formed into a hemispherical surface, such that inadvertent sliding frictional force is not generated at the time of sliding writing according to the writing direction and the writing angle.

The pen tip main body portion 20*a* may be formed as a defibrated bundle-like brush part in which each distal end is a free end without binding fibers. As a result, the surgical pen A can be used as a brush-type pen, and the dischargeability of the ink can be improved while reducing the sliding frictional force on the surface of a living body at the time of writing operation. Also, the center core 20 may not be a fiber bundle core, but may be a molding core formed by extrusion molding in which a space communicates with the inside.

In addition, the shape of the pen tip main body portion 20*a* can also be a so-called chisel shape in which the distal end is a flat surface inclined with respect to the pen axis center and the distal end is sharp in order to enable selection of the drawn line width.

As will be described in detail later, the pen tip portion 2 is configured to have a bending strength of 1.0 N or more after irradiation with γ-rays of 25 kGy to 70 kGy. Further, the rate of decrease in bending strength of the pen tip portion 2 before and after γ-ray irradiation sterilization is preferably less than 10%.

That is, the pen tip main body portion 20*a* in the center core 20 is prevented from being inadvertently bent and plastically deformed or broken when being pressed against the writing object.

The outer diameter of the pen tip main body portion 20*a* can be appropriately determined according to a desired drawn line width. By setting the outer diameter to @0.5 to 2.0 mm, more preferably 0.8 to 1.4, the ink dischargeability is stabilized, and marking at the target site on the surface of a living body can be easily performed.

The chip 22 is press-fitted and fixed from the distal end side into the distal end fitting part 121 of the pen tip receiving part 12 at the distal end of the shaft body portion 1, so that the pen tip portion 2 can be integrally fixed to the shaft body portion 1.

The chip 22 is a mushroom-shaped or substantially spindle-shaped thin tube in appearance, and includes a columnar press-fitting part 220 extending parallel to the axial direction on the base end side, and an exterior part 221 bulging in the radial direction from the press-fitting part 220 on the distal end side. The chip 22 of the present embodiment is made of high density polyethylene (HDPE).

As shown in FIGS. 2(*a*) and 2(*b*), the press-fitting part 220 is a part press-fitting to the distal end fitting part 121 of the pen tip receiving part 12, and is pressed and fixed by the distal end fitting part 121 in a state where the pen tip portion 2 is mounted on the pen tip receiving part 12.

As shown in FIG. 2(*b*), the exterior part 221 has a truncated cone shape whose diameter gradually decreases from the base end side to the distal end side, and is formed such that the peripheral surface is a tapered surface that is continuous with the peripheral wall of the distal end fitting part 121 of the pen tip receiving part 12 and inclined toward the distal end side in a state where the pen tip portion 2 is mounted on the pen tip receiving part 12.

Further, a step part between the press-fitting part 220 and the exterior part 221, that is, a rear end surface of the exterior part 221 is a flat surface orthogonal to the axial direction, and is an abutting surface part which is face-abutted on an opening end surface of the pen tip receiving part 12 (distal end fitting part 121) when the pen tip portion 2 is mounted on the pen tip receiving part 12. That is, the pen tip portion 2 has an abutting surface part which is press-fitted and fixed to the shaft body portion 1 via the pen tip receiving part 12 and is face-abutted on the opening end surface of the pen tip receiving part 12.

Furthermore, as shown in FIG. 2(*b*), the base end part of the center core 20 is a wadding insertion part 20*b* formed in a substantially sharp distal end shape toward the base end side direction. The wadding insertion part 20*b* is inserted and arranged so as to face the inside of the wadding portion 3 along the axial center of the wadding portion 3, and sucks the ink impregnated in the wadding portion 3 so as to be flowable toward the distal end side.

The ink impregnated in the wadding portion 3 is the ink of <2. Properties of surgical ink> described above, so that the fixability on the wet surface of a living body is improved while dischargeability and outflow properties of the ink after the γ-ray irradiation sterilization treatment are stabilized.

In addition, as shown in FIGS. 2(*c*), 3(*a*), and 3(*b*), the surgical pen A1 includes a cap body 4 attachable to and detachable from the distal end portion of the shaft body portion 1. The cap body 4 is configured to cover the pen tip portion 2 in a state of being mounted on the shaft body portion 1 to prevent volatilization of the surgical ink.

Specifically, the cap body 4 includes the pen tip portion 2 in a state of being mounted on the shaft body portion 1, and has a pressure-bonded surface portion 43 which is crimped into engagement with an outer peripheral wall portion of the pen tip receiving part 12 on an inner peripheral surface portion, thereby constituting a volatilization prevention means.

As shown in FIG. 2(*c*), the cap body 4 has a double cylindrical structure by a bottomed cylindrical outer cap 41 and a bottomed cylindrical inner cap 42 that is inserted and fitted into the outer cap 41 and arranged at the axial center portion. Also, in the cap body 4, an inner cylindrical hole formed by the two caps 41, 42 is formed along an outer shape of the pen tip portion 2.

The inner cap 42 includes a bottomed cylindrical cap main body part 420 having the pressure-bonded surface portion 43 on the inner peripheral surface portion, and a leaf spring part 421 that has a constant gap with the outer peripheral surface of the cap main body part 420 and is bent outward from an opening of the cap main body part 420 and extends.

The leaf spring part 421 has a cylindrical shape larger than the cap main body part 420 and covers the outside of the cap main body part 420. That is, the inner cap 42 has a double cylindrical structure with the inner cap main body part 420 and the outer leaf spring part 421.

The inner cap 42 is inserted and fitted to the outer cap 41 with an opening direction being the same as an opening of the outer cap 41, and is crimped and fixed to the inner peripheral surface of the outer cap 41 via the leaf spring part 421.

In the outer cap 41, an inner peripheral wall is formed along an outer shape of the distal end support part 120 of the shaft body portion 1, and an inner peripheral wall portion is formed so as to be able to be pressure-bonded to the outer peripheral surface of the distal end support part 120.

That is, the inner peripheral wall portion on the opening side of the outer cap 41 is configured as a second pressure-bonded surface portion 44 crimped to the flange part 14 of the distal end support part 120 of the pen tip receiving part 12.

In addition, a thick wall portion in which the peripheral wall protrudes inward toward the axial center is formed on the inner bottom portion side of the outer cap 41, thereby forming an abutting step part 410 on which the outer end surface of the inner cap 42 inserted and fitted into the outer cap 41 is abutted.

In the inner cap 42, the inner peripheral wall of the cap main body part 420 is formed along an outer shape of the distal end fitting part 121 of the shaft body portion 1 and the pen tip portion 2 at the distal end, and is formed so as to be able to be pressure-bonded to the outer peripheral surface of the distal end fitting part 121. That is, the inner peripheral wall portion of the cap main body part 420 is formed on the pressure-bonded surface portion 43 crimped to an outer wall surface portion of the distal end fitting part 121 of the pen tip receiving part 12.

Further, the inner peripheral wall portion on the distal end side of the pressure-bonded surface portion 43 is formed on a facing surface portion which faces the outer peripheral surface of the pen tip portion 2 in parallel and has a constant minimum gap therebetween.

That is, the exposed portion of the pen tip portion 2 from the shaft body portion 1 (the pen tip main body portion 20*a* and the exterior part 221 of the chip 22) is stored close to the inner wall of the cap main body part 420 of the inner cap 42 in the mounted state of the cap body 4 of the shaft body portion 1.

As described above, by the pressure-bonded surface portion 43 formed on the inner cap 42 and the second pressure-bonded surface portion 44 formed on the outer cap 41, a communication path between the pen tip portion 2 in the cap body and the outside is blocked in two stages to improve the sealability as much as possible, the gap between the pen tip portion 2 and the inner wall of the cap body 4 is minimized to make ink diffusion space as small as possible, and volatilization of the ink can be prevented.

Furthermore, the cap body 4 includes a nonwoven fabric pad core 45 filled in the inner bottom portion of the inner cap 42 as a volatilization prevention means.

As a result, in a state where the cap body 4 is mounted on the shaft body portion 1, the pen tip main body portion 20*a* arranged in the inner bottom portion of the inner cap 42 is buried and covered in the pad core 45, and the pad core 45 absorbs the ink exuded from the pen tip main body portion 20*a* to be in a wet state.

As a result, the pen tip main body portion 20*a* is covered with the pad core 45 always in a wet state with the ink, and further ink exudation is suppressed, and the contact area in contact with the outside air in the gap is reduced, so that inadvertent volatilization of the ink can be reliably prevented. The pad core 45 of the present embodiment is preferably made of polyethylene terephthalate (PET).

As described above, the surgical pen A1 according to the present embodiment is configured to be suitable for medical devices that ensure safety in accordance with the sterilization validation and able to be widely distributed on the market, and improve biocompatibility and writing operability.

5. Configuration of Surgical Pen According to Second Embodiment

Figure 4:
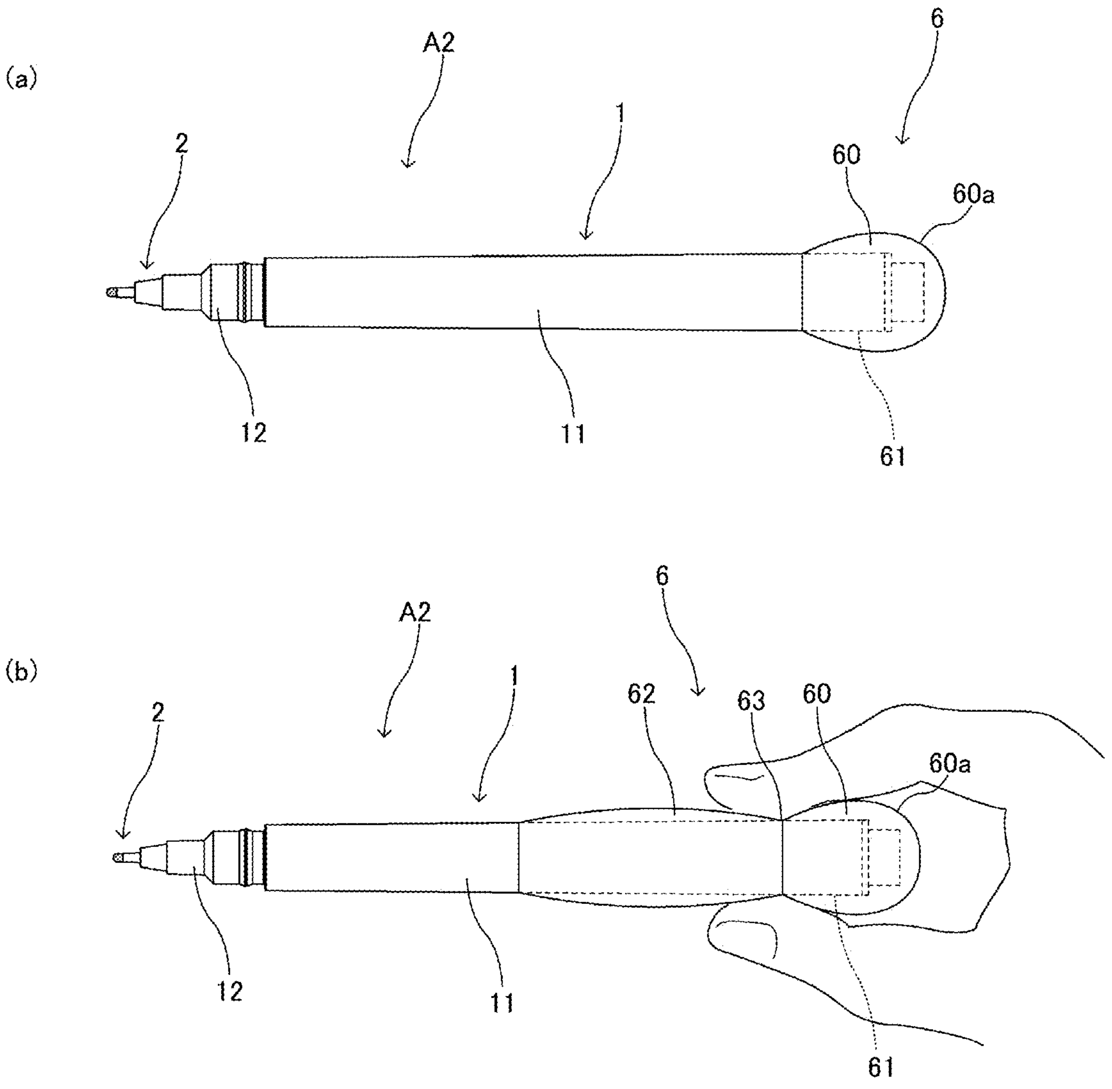
FIG. 4 is an external side view showing a configuration of a surgical pen according to a second embodiment.

Next, a surgical pen A2 according to a second embodiment of the present invention will be described. FIG. 4 is a side view showing a configuration of the surgical pen according to the present embodiment. In the following description, the same components as those of the first embodiment are denoted by the same reference numerals, and the description thereof will be omitted.

Usually, the handle of a writing instrument is configured such that the index finger is placed while sandwiching the body part 11 of the pen, that is, a substantially front half body part of the shaft body portion 1 close to the pen tip portion 2 between the middle finger and the thumb, and the rear half body part is accommodated between the second joint and the third joint of the index finger.

In the normal handle of a writing instrument, the contact area between the fingers and the writing instrument inevitably increases, and thus, during the writing operation, the length of the fingers, the force to the writing target, the pressing angle of the pen tip, and the like become a long-time habit slightly different for each person, and appear as the strength of the writing pressure.

For this reason, according to the writing operation by the normal handle of a writing instrument, it is good in a case where the writing target is a hard bone tissue, but in a case where the writing target is a weak surface of a living body such as an organ, an inadvertent writing pressure is applied and transmitted as a pressing stress from the pen tip portion 2, which may cause damage.

Therefore, as shown in FIGS. 4(*a*) and 4(*b*), in the surgical pen A2 according to the present embodiment, a holder 6 for writing operation is provided at the tail end part of the shaft body portion 1 in order to stabilize the finger-pinching writing operation and improve the writing operability on the weak surface of a living body.

As shown in FIGS. 4(*a*) and 4(*b*), the holder 6 has a bulging part 60 that bulges outward from the tail end of the shaft body portion 1. Specifically, the holder 6 of the aspect shown in FIG. 4(*a*) has a substantially elliptical spherical shape, is formed along the major axis direction, and has an insertion hole 61 inserted and fitted to the tail portion of the body part 11 of the shaft body portion 1, and is configured to be attachable to and detachable from the tail end part of the shaft body portion 1.

As a result, it is possible to stably perform the finger-pinching writing operation in which the tail end part is pinched with fingers via the holder 6 and the pen tip portion 2 at the distal end (pen tip main body portion 20*a*) is placed on the target site on the surface of a living body for drawing.

In other words, in a state where the tail portion of the shaft body portion 1 is inserted into the insertion hole 61 and the holder 6 is mounted on the shaft body portion 1, the bulging part 60 bulges radially outward from the outer peripheral surface of the shaft body portion 1, so that a finger-pinching part is formed at the boundary between the tail portion of the shaft body portion 1 and the holder 6.

That is, a holding form is realized by pinching with each fingertip a boundary portion between the tail end part of the shaft body portion 1 and the holder 6 with the tips of the thumb and the index finger or the tail end part with the tips of the thumb and the middle finger or the like, and each finger cushion is brought into surface contact with a curved surface 60*a* of the bulging part 60.

In a case where the writing operation is performed in this pen pinching form, the pen tip portion 2 at the distal end (pen tip main body portion 20*a*) is placed on the surface of a living body and a writing action is performed with the boundary portion between the tail end part of the shaft body portion 1 and the holder 6 as a fulcrum, and there is no possibility that an inadvertent writing pressure is applied.

Further, during writing, since the finger cushion abuts on the curved surface 60*a* of the bulging part 60, the holding form is stabilized and the writing operability is improved.

In addition, the holder 6 of the aspect shown in FIG. 4(*b*) may further include a second bulging part 62 that covers and bulges the outer peripheral surface of a rear half portion of the body part 11 of the shaft body portion 1, and may have a constricted shape by the bulging part 60 and the second bulging part 62. That is, a constricted part 63 between the bulging part 60 and the second bulging part 62 can function as a finger-pinching part to be pinched with the fingertip.

As a result, the constricted part 63 between the bulging part 60 and the second bulging part 62 is used as the pinching position, and the finger-pinching writing operation using the pinching position as the fulcrum can be further stabilized, and thus, the damage risk can be reduced without applying an inadvertent writing pressure stress on the surface of a living body.

6. γ-Ray Irradiation Conditions

The surgical ink configured as described above and the surgical pen filled with the surgical ink are subjected to γ-ray irradiation sterilization treatment according to the provisions of JIS/ISO standard (JIS T 0806-1/ISO 11137-1 and JIS T 0806-2/ISO 11137-2) in an irradiation facility using Co60 as a radionuclide. The γ-ray irradiation facility and the like are as follows.

Irradiation facility: Japan Irradiation Service Co., Ltd., Tokai Center

Irradiation device: gamma irradiation facility tote box type (JS10000HD manufactured by Nordion)

Irradiation container: Tote box (78×50×150 cm: internal volume: about 630 L) totally made of aluminum Irradiation source: Co60

Set target absorbed dose: 50 kGy (actual measured value 54.0 kGy to 67.6 kGy)

Irradiation time: 26,000 sec

Maximum source capacity: 111 PBq (3 MCi)

Tote box (γ-ray irradiation container):

In addition, the absorbed dose of γ-rays using the surgical ink and the surgical pen using the same as an irradiated object is 25 kGy to 70 kGy. The absorbed dose is a dose that secures sterility in common for the surgical ink and the surgical pen using the same, and is determined by the following procedures (1) to (5) in accordance with the provisions of the sterilization validation (JIS T 0806-1/ISO 11137-1 and JIS T 0806-2/ISO 11137-2). (1) Material test, (2) Bioburden measurement, (3) Sterilization dose setting test, (4) Sterility test, (5) Dose distribution measurement The (1) bioburden measurement and the (4) sterility test are in accordance with JIS/ISO standards "Determination of a population of microorganisms on products" (JIS T 11737-1/ISO 11737-1) and "Tests of sterility performed in the definition, validation and maintenance of a sterilization process" (JIS T 11737-2/ISO 11737-2), respectively.

That is, the sterility assurance level (SAL) is set to $10^{-6}$, and the absorbed dose of γ-rays at which the SAL is achieved is determined from the number of microorganisms surviving the irradiated object per unit obtained from (1) bioburden measurement and (4) sterility test and the lethal rate thereof (time required to reduce the number of microorganisms to 1/10: D value). In other words, the γ-ray irradiation time for ensuring sterility is the time required to achieve the absorbed γ-ray dose that achieves SAL (about 2 to 3 hours).

The absorbed dose that achieves SAL in the present invention is 25 kGy to 70 kGy, and more preferably 25 kGy to 45 kGy. When the absorbed dose is less than 25 kGy, sterility is not secured, and when the absorbed dose is more than 70 kGy, radiation degradation is promoted, and the property of the ink may be inadvertently modified or the mechanical strength of the surgical pen may be lowered.

The range of the absorbed dose of 25 kGy to 70 kGy is an error that can be made according to the relative distance between the position where each object to be sterilized is stored and arranged in the tote box and the radiation source, and is a range that the sterility in (4) sterility test is guaranteed and the mechanical strength in (1) material test is guaranteed.

7. Examples of Surgical Ink

Next, examples of the surgical ink of the present invention will be described. The surgical inks according to the present examples and comparative examples are prepared according to <2. Method for preparing surgical ink>. Hereinafter, a specific description will be given according to the following order.

(1) Preparation of dispersion liquid and comparative liquids:

(2) Preparation of ink compositions and comparative compositions:

(3) Preparation of examples of surgical inks:

(1) Preparation of Dispersion Liquid and Comparative Liquids

Dispersion liquid A1 as a base material of the surgical inks according to the examples contains the activated carbon powder (a), the water-soluble polymer (b), sodium hydroxide as the base substance (c), and the water (d) as a residue.

Also, for comparison, liquids in which the base substance (c) in the dispersion liquid A1 was replaced with 0.1 parts by weight of sodium carbonate, and the activated carbon powder (a) was replaced with red iron oxide, black iron oxide, and a water-soluble black dye were defined as Comparative Liquid R1, Comparative Liquid R2, and Comparative Liquid R3, respectively. Specific preparation procedures of the dispersion liquid A1 and comparative liquids R1 to R3 are as follows.

(Dispersion Liquid A1)

A mixture obtained by adding 9.00 parts by weight of the activated carbon powder (a), 6.30 parts by weight of polyvinylpyrrolidone as the water-soluble polymer (b), 0.13 parts by weight of sodium hydroxide as the base substance (c), and 84.57 parts by weight of the water (d) as a residue was stirred and mixed with a propeller stirrer at room temperature for 1 hour so that the total amount was 100 parts by weight. The activated carbon powder (a) had an average particle diameter of 35 μm and an average pore diameter of 3.4 nm, and the polyvinylpyrrolidone as the water-soluble polymer (b) had a viscosity average molecular weight of 25,000.

In a paint shaker pot, 150 g of zirconia beads having a diameter of 0.5 mm were put into the obtained mixture, and the mixture was shaken for 3 hours. The coarse particles contained in this dispersion liquid were removed, and the dispersion liquid A1 was prepared by preparing so that the dispersion particle size of 90% or more of all particles was 500 nm or less and the solid concentration was 10 wt %. The components of the dispersion liquid A1 are shown in Table 1.

| | | Dispersion liquid A1 |
|---|---|---|
| Activated carbon powder (a) | Average particle diameter: 35 μ<br>Average pore diameter: 3.4 nm | 9.00 |
| Water-soluble polymer (b) | PVP | 6.30 |
| Base substance (c) | NaOH | 0.13 |
| Water | | 84.57 |
| Total amount | | 100 |

(Comparative Liquid R1)

A mixture obtained by adding 10.00 parts by weight of red iron oxide as a coloring material, 8.50 parts by weight of polyvinylpyrrolidone as the water-soluble polymer (b), 0.10 parts by weight of sodium hydroxide as the base substance (c), and 81.40 parts by weight of water as a residue was stirred and mixed with a propeller stirrer at room temperature for 1 hour so that the total amount was 100 parts by weight.

In a paint shaker pot, 150 g of glass beads having a diameter of 0.7 mm were put into the obtained mixture, and the mixture was shaken for 3 hours. The coarse particles contained in this dispersion liquid were removed, and Comparative Liquid R1 was prepared by preparing so that the dispersion particle size of 90% or more of all particles was 500 nm or less and the solid concentration was 10 wt %.

(Comparative Liquid R2)

Comparative Liquid R2 was prepared according to Comparative Liquid R1 in the same manner as in Comparative Liquid R1 except that the coloring material of Comparative Liquid R1 was changed to 10.00 parts by weight of black iron oxide.

(Comparative Liquid R3)

Comparative Liquid R3 was prepared according to Comparative Liquid R1 in the same manner as in Comparative Liquid R1 except that the coloring material of Comparative Liquid R1 was changed to 10.00 parts by weight of a water-soluble black dye. The components of each of Comparative Liquids R1 to R3 are shown in Table 2.

TABLE 2

| | | Comparative Liquid R1 | Comparative Liquid R2 | Comparative Liquid R3 |
|---|---|---|---|---|
| Coloring material | Red iron oxide | 10.00 | 0.00 | 0.00 |
| | Black iron oxide | 0.00 | 10.00 | 0.00 |
| | Water-soluble black dye | 0.00 | 0.00 | 10.00 |
| Water-soluble polymer (b) | PVP | 8.50 | 8.50 | 8.50 |
| Base substance (c) | NaOH | 0.10 | 0.10 | 0.10 |
| | Water | 81.40 | 81.40 | 81.40 |
| | Total amount | 100 | 100 | 100 |

weight of water as a residue to give a total amount of 100 parts by weight, and stirring the mixture with a propeller stirrer at room temperature for 30 minutes.

(Ink Composition 2)

Ink Composition 2 was prepared by adding 66.12 parts by weight of the dispersion liquid A1, 20.00 parts by weight of propylene glycol as the water-soluble organic solvent (B) and 5.00 parts by weight of ethanol, and 8.88 parts by weight of water as a residue to give a total amount of 100 parts by weight, and stirring the mixture with a propeller stirrer at room temperature for 30 minutes.

(Ink Composition 3)

Ink Composition 3 was prepared by excluding ethanol from Ink Composition 2. Specifically, Ink Composition 3 was prepared by adding 66.12 parts by weight of the dispersion liquid A1, and 25.00 parts by weight of propylene glycol as the water-soluble organic solvent (B), and 8.88 parts by weight of water as a residue to give a total amount of 100 parts by weight, and stirring the mixture with a propeller stirrer at room temperature for 30 minutes.

(Ink Composition 4)

Ink Composition 4 was prepared by classifying Ink Composition 2 using a centrifuge to remove coarse particles.

(Ink Composition 5)

Ink Composition 5 was prepared by classifying the Ink Composition 3 using a centrifuge to remove coarse particles.

Each of the obtained Compositions 1 to 5 showed a uniform black color in appearance. The components of each of Compositions 1 to 5 are shown in Table 3.

TABLE 3

| | | Composition 1 | Composition 2 | Composition 3 | Composition 4 | Composition 5 |
|---|---|---|---|---|---|---|
| Dispersion liquid A | A1 | 69.42 | 66.12 | 66.12 | 66.12 | 66.12 |
| Water-soluble organic solvent | Propylene glycol | 5.00 | 20.00 | 25.00 | 20.00 | 25.00 |
| B | Ethanol | 15.00 | 5.00 | 0.00 | 5.00 | 0.00 |
| | Water | 10.58 | 8.88 | 8.88 | 8.88 | 8.88 |
| | Total amount | 100.00 | 100.00 | 100.00 | 100.00 | 100.00 |
| | Note | | | | Coarse particles removed | Coarse particles removed |

(2) Preparation of Ink Compositions and Comparative Compositions

A predetermined amount of the dispersion liquid A1 was each weighed, and a predetermined amount of propylene glycol as the water-soluble organic solvent (B), and a predetermined amount of ethanol as necessary, and water as a residue were added thereto to prepare Ink Compositions 1 to 5 before γ-ray irradiation prepared to the total amount of 100 parts by weight.

In addition, for comparison, Comparative Compositions 1 to 3 were prepared by replacing the dispersion liquid A1 with Comparative Liquids R1 to R3, respectively. Specific preparation procedures of each of the Compositions 1 to 5 and Comparative Compositions 1 to 3 are as follows.

(Ink Composition 1)

Ink Composition 1 was prepared by adding 69.42 parts by weight of the dispersion liquid A1, 5.00 parts by weight of propylene glycol as the water-soluble organic solvent (B) and 15.00 parts by weight of ethanol, and 10.58 parts by weight of water as a residue to give a total amount of 100 parts by weight, and stirring the mixture with a propeller stirrer at room temperature for 30 minutes.

(Comparative Composition 1)

Comparative Composition 1 was prepared by adding 50.00 parts by weight of Comparative Liquid R1 containing red iron oxide, 10.00 parts by weight of propylene glycol as the water-soluble organic solvent (B), and 30.00 parts by weight of water as a residue, and stirring the mixture with a propeller stirrer at room temperature for 30 minutes.

(Comparative Composition 2)

Comparative Composition 2 was prepared by adding 50.00 parts by weight of Comparative Liquid R2 containing black iron oxide, 10.00 parts by weight of propylene glycol as the water-soluble organic solvent (B), and 30.00 parts by weight of water as a residue, and stirring the mixture with a propeller stirrer at room temperature for 30 minutes.

(Comparative Composition 3)

Comparative Composition 3 was prepared by adding 50.00 parts by weight of Comparative Liquid R2 containing a water-soluble black dye, 10.00 parts by weight of propylene glycol as the water-soluble organic solvent (B), and 30.00 parts by weight of water as a residue, and stirring the mixture with a propeller stirrer at room temperature for 30 minutes.

Each of the obtained Comparative Compositions 1 to 3 showed a uniform black color in appearance. The components of each of Comparative Compositions 1 to 3 are shown in Table 4.

TABLE 4

| | | Comparative Composition 1 | Comparative Composition 2 | Comparative Composition 3 |
|---|---|---|---|---|
| Comparative Liquid R | R1 | 50.00 | 0.00 | 0.00 |
| | R2 | 0.00 | 50.00 | 0.00 |
| | R3 | 0.00 | 0.00 | 50.00 |
| Water-soluble organic solvent B | Propylene glycol | 10.00 | 10.00 | 10.00 |
| Water | | 30.00 | 30.00 | 30.00 |
| Total amount | | 90.00 | 90.00 | 90.00 |

(3) Preparation of Examples of Surgical Inks:

Ink Compositions 1 to 5 as prepared described above were irradiated with γ-rays at an absorbed dose of 25 kGy to 70 kGy in accordance with <6. γ-Ray irradiation conditions> to obtain Examples 1 to 5 of surgical inks.

8. Evaluation of Functionality of Surgical Ink and Surgical Pen after γ-Ray Irradiation Next, evaluation of functionality of the surgical ink and the surgical pen of the present invention after γ-ray irradiation will be described in the following order.

(1) Verification of properties of surgical ink before and after γ-ray irradiation (2) Verification of temporal stability of surgical ink before and after γ-ray irradiation (3) Verification of bending strength of pen tip portion before and after γ-ray irradiation (4) Performance test of surgical ink (ink composition) before γ-ray irradiation and surgical marker (5) Biocompatibility demonstration test of surgical ink and surgical marker after γ-ray irradiation (1) Verification of Properties of Surgical Ink Before and after γ-Ray Irradiation Viscosity measurement, pH measurement, and average particle size measurement were performed in accordance with <3. Properties of surgical ink> described above to verify the properties of the inks, for Ink Compositions 1 to 5 before γ-ray irradiation prepared as <7. Examples of surgical ink> described above, and Examples 1 to 5 of the surgical inks prepared by performing γ-ray irradiation corresponding thereto, and Comparative Compositions 1 to 3. The results are shown in Tables 5 to 7.

In the following, various parameters such as viscosity (mPa·s), pH, and average particle size (nm) shown in Tables 5 to 7 are values measured immediately after preparation of Ink Compositions 1 to 5, Comparative Compositions 1 to 3, and the surgical inks of Examples 1 to 5, respectively, and are shown as average values of n=10. In addition, the "initial value" in Tables 5 and 7 indicates that various parameters are 0 reference values in the temporal stability of the ink described later.

TABLE 5

| Before γ-ray irradiation (initial value) | | | | | |
|---|---|---|---|---|---|
| | Composition 1 | Composition 2 | Composition 3 | Composition 4 | Composition 5 |
| Viscosity (mPa · s) | 4.9 | 5.7 | 5.6 | 5.0 | 4.9 |
| pH | 8.8 | 8.7 | 8.7 | 8.7 | 8.7 |
| Average particle size (nm) | 279 | 285 | 279 | 244 | 240 |
| Solid content (%) | 7.3 | 6.9 | 6.8 | 5.4 | 5.2 |

Note
Coarse particles removed
Coarse particles removed

TABLE 6

| | Comparative Composition 1 | Comparative Composition 2 | Comparative Composition 3 |
|---|---|---|---|
| Viscosity (mPa · s) | 5.5 | 5.4 | 4.2 |
| pH | 8.2 | 9.1 | 7.1 |
| Average particle size (nm) | 452 | 1130 | N.D |

TABLE 7

| After γ-ray irradiation (initial value) | | | | | |
|---|---|---|---|---|---|
| | Example 1 | Example 2 | Example 3 | Example 4 | Example 5 |
| Viscosity (mPa · s) | 5.3 | 5.9 | 5.6 | 5.1 | 5.3 |
| pH | 8.8 | 7.9 | 7.0 | 8.0 | 6.9 |
| Average particle size (nm) | 310 | 310 | 278 | 264 | 269 |
| Solid content (%) | 7.3 | 6.9 | 6.8 | 5.4 | 5.2 |

Note
Coarse particles removed
Coarse particles removed

In Comparative Compositions shown in Table 6, in Comparative Composition 1 in which red iron oxide was used as a coloring material and Comparative Composition 2 in which black iron oxide was used as a coloring material, it was shown that the average particle size became coarse, and the dispersibility was deteriorated, and it was predicted that the writing property would be deteriorated. In Comparative Composition 3, dispersibility could not be determined because the water-soluble black dye was used as a coloring material, but it was predicted that the writing property would be deteriorated similarly to Comparative Composition 1 and Comparative Composition 2.

On the other hand, as shown in Tables 5 and 7, the Ink Compositions 1 to 5 before γ-ray irradiation and corresponding Surgical Inks 1 to 5 after γ-ray irradiation all showed good values in viscosity (mPa·s), pH, and average particle size (nm).

In particular, the change rates of various parameters indicating the properties of the ink before and after γ-ray irradiation tend to be low, and the ink properties can be evaluated to be stable. This is presumed to be because the carbon material shields γ-rays to prevent deterioration of other components such as the water-soluble polymer. Studies by the present inventors have revealed that this effect is particularly remarkable when the carbon material is an activated carbon powder and the water-soluble polymer is polyvinylpyrrolidone.

(2) Verification of Temporal Stability of Surgical Ink Before and After γ-Ray Irradiation Next, a temporal stability test of the surgical ink before and after γ-ray irradiation was performed. In this test, Ink Compositions 1 to 5 before γ-ray irradiation and Examples 1 to 5 of the inks after γ-ray irradiation were allowed to stand in a thermostatic chamber at 25° C. or 50° C. for 1 month, 2 months, 3 months, and 6 months, respectively, to verify the stability in long-term storage.

Various parameters of the viscosity (mPa·s), pH, and average particle size (nm) of Ink Compositions 1 to 5 before γ-ray irradiation and Examples 1 to 5 of the inks after γ-ray irradiation obtained under each condition were measured and compared with the initial values described above.

That is, based on the initial values, various parameters such as viscosity (mPa·s), pH, and average particle size (nm) were determined as the temporal change rates, and the temporal stability was evaluated. First, Tables 8 to 10 show the temporal change rates of various parameters of Ink Compositions 1 to 5 under the condition of 25° C.

TABLE 8

| Before γ-ray irradiation Viscosity change rate at 25° C. (%) | | | | | |
|---|---|---|---|---|---|
| | Composition 1 | Composition 2 | Composition 3 | Composition 4 | Composition 5 |
| Initial | 0.0 | 0.0 | 0.0 | 0.0 | 0.0 |
| 1 month | −6.6 | −3.0 | −4.2 | 0.2 | −3.7 |
| 2 months | 2.2 | −4.2 | −0.6 | −0.7 | 0.0 |
| 3 months | 7.0 | −3.5 | −5.0 | −1.2 | −3.9 |
| 6 months | 13.8 | 4.2 | 0.0 | 7.3 | 2.3 |

TABLE 9

| Before γ-ray irradiation pH Change rate at 25° C. (%) | | | | | |
|---|---|---|---|---|---|
| | Composition 1 | Composition 2 | Composition 3 | Composition 4 | Composition 5 |
| Initial | 0.0 | 0.0 | 0.0 | 0.0 | 0.0 |
| 1 month | −4.4 | −4.6 | −4.5 | −5.4 | −4.6 |
| 2 months | −8.3 | −7.0 | −6.4 | −7.9 | −6.8 |
| 3 months | −8.2 | −8.2 | −6.9 | −8.7 | −7.2 |
| 6 months | −8.2 | −8.4 | −6.8 | −8.8 | −6.8 |

TABLE 10

| Before γ-ray irradiation Average particle diameter change rate at 25° C. (%) | | | | | |
|---|---|---|---|---|---|
| | Composition 1 | Composition 2 | Composition 3 | Composition 4 | Composition 5 |
| Initial | 0.0 | 0.0 | 0.0 | 0.0 | 0.0 |
| 1 month | 7.8 | −0.4 | −7.8 | 0.1 | 2.3 |
| 2 months | 2.7 | 3.9 | −1.7 | −0.8 | 3.6 |
| 3 months | 0.2 | 0.6 | 0.1 | −4.3 | −7.7 |
| 6 months | 9.4 | 0.7 | −3.2 | 0.3 | −1.4 |

Next, Tables 11 to 13 show the temporal change rates of various parameters of Ink Compositions 1 to 5 under the condition of 50° C.

TABLE 11

| Before γ-ray irradiation Viscosity change rate at 50° C. (%) | | | | | |
|---|---|---|---|---|---|
| | Composition 1 | Composition 2 | Composition 3 | Composition 4 | Composition 5 |
| Initial | 0.0 | 0.0 | 0.0 | 0.0 | 0.0 |
| 1 month | −3.8 | −1.2 | −2.0 | 1.8 | −2.3 |
| 2 months | 4.0 | 0.2 | 1.0 | 1.2 | −0.6 |
| 3 months | 7.0 | −0.7 | −5.0 | 2.0 | −2.0 |
| 6 months | 18.8 | 8.9 | 3.2 | 13.1 | 4.5 |

TABLE 12

| Before γ-ray irradiation pH Change rate at 50° C. (%) | | | | | |
|---|---|---|---|---|---|
| | Composition 1 | Composition 2 | Composition 3 | Composition 4 | Composition 5 |
| Initial | 0.0 | 0 | 0.0 | 0.0 | 0.0 |
| 1 month | −11.1 | −10.2 | −8.7 | −11.6 | −9.0 |
| 2 months | −13.1 | −12.6 | −10.4 | −14.4 | −11.2 |
| 3 months | −14.3 | −16 | −12.4 | −17.4 | −13.0 |
| 6 months | −18.7 | −24.3 | −21.1 | −25.9 | −22.2 |

TABLE 13

| Before γ-ray irradiation Average particle diameter change rate at 50° C. (%) | | | | | |
|---|---|---|---|---|---|
| | Composition 1 | Composition 2 | Composition 3 | Composition 4 | Composition 5 |
| Initial | 0.0 | 0.0 | 0.0 | 0.0 | 0.0 |
| 1 month | 11.0 | −4.6 | −5.2 | 1.3 | −3.1 |
| 2 months | 16.5 | −1.0 | −5.6 | 6.5 | −6.5 |
| 3 months | 19.1 | 1.5 | 2.4 | 10.3 | 1.8 |
| 6 months | 23.6 | 0.3 | −1.0 | 20.8 | 3.3 |

Next, Tables 14 to 16 show the temporal change rates of various parameters of Examples 1 to 5 of the inks under the condition of 25° C.

TABLE 14

| After γ-ray irradiation Viscosity change rate at 25° C. (%) | | | | | |
|---|---|---|---|---|---|
| | Ex-ample 1 | Ex-ample 2 | Ex-ample 3 | Ex-ample 4 | Ex-ample 5 |
| Initial | 0.0 | 0.0 | 0.0 | 0.0 | 0.0 |
| 1 month | −7.4 | −0.9 | −2.3 | 5.9 | 2.5 |
| 2 months | 2.6 | −0.9 | −2.2 | 7.1 | 6.7 |
| 3 months | 5.3 | −0.2 | −1.4 | 6.1 | 4.6 |
| 6 months | 12.8 | 2.4 | 1.8 | N.D | N.D |

TABLE 15

| After γ-ray irradiation PH Change rate at 25° C. (%) | | | | | |
|---|---|---|---|---|---|
| | Ex-ample 1 | Ex-ample 2 | Ex-ample 3 | Ex-ample 4 | Ex-ample 5 |
| Initial | 0.0 | 0.0 | 0.0 | 0.0 | 0.0 |
| 1 month | −6.8 | 0.1 | −1.3 | 8.6 | 9.8 |
| 2 months | −12.4 | 1.5 | 0.4 | 8.2 | 10.7 |
| 3 months | −11.9 | −2.2 | −3.6 | 5.7 | 5.8 |
| 6 months | −14.8 | −4.7 | −4.5 | N.D | N.D |

TABLE 16

| After γ-ray irradiation Average particle diameter change rate at 25° C. (%) | | | | | |
|---|---|---|---|---|---|
| | Ex-ample 1 | Ex-ample 2 | Ex-ample 3 | Ex-ample 4 | Ex-ample 5 |
| Initial | 0.0 | 0 | 0 | 0 | 0 |
| 1 month | −2.9 | −3.4 | −6.3 | 0 | −1.5 |
| 2 months | −4.1 | 3.7 | −4.4 | 14 | 6 |
| 3 months | 0.9 | −6.7 | −9.3 | 7.9 | 2.6 |
| 6 months | 2.1 | −7.9 | −4.9 | N.D | N.D |

Next, Tables 17 to 19 show the temporal change rates of various parameters of Examples 1 to 5 of the inks under the condition of 50° C.

TABLE 17

| After γ-ray irradiation Viscosity change rate at 50° C. (%) | | | | | |
|---|---|---|---|---|---|
| | Ex-ample 1 | Ex-ample 2 | Ex-ample 3 | Ex-ample 4 | Ex-ample 5 |
| Initial | 0.0 | 0.0 | 0.0 | 0.0 | 0.0 |
| 1 month | −4.9 | 0.0 | −1.8 | 7.3 | 5.7 |
| 2 months | 6.2 | 2.4 | −0.4 | 0.7 | 8.4 |
| 3 months | 6.8 | 6.0 | −0.6 | 6.1 | 9.9 |
| 6 months | 18.5 | 17.2 | 8.0 | N.D | N.D |

TABLE 18

| After γ-ray irradiation pH Change rate at 50° C. (%) | | | | | |
|---|---|---|---|---|---|
| | Ex-ample 1 | Ex-ample 2 | Ex-ample 3 | Ex-ample 4 | Ex-ample 5 |
| Initial | 0.0 | 0.0 | 0.0 | 0.0 | 0.0 |
| 1 month | −14.8 | −8.4 | −10.5 | −7.3 | −9.7 |
| 2 months | −21.1 | −17.6 | −21.5 | −17.3 | −18.7 |
| 3 months | −24.4 | −23.5 | −26.9 | −17.8 | −19.3 |
| 6 months | −26.6 | −26.0 | −30.1 | N.D | N.D |

TABLE 19

| After γ-ray irradiation Average particle diameter change rate at 50° C. (%) | | | | | |
|---|---|---|---|---|---|
| | Ex-ample 1 | Ex-ample 2 | Ex-ample 3 | Ex-ample 4 | Ex-ample 5 |
| Initial | 0.0 | 0 | 0 | 0 | 0 |
| 1 month | 8.7 | −8.4 | −0.8 | 11.9 | 9.3 |
| 2 months | 4.0 | −6.7 | −5.9 | 7.6 | 7.4 |
| 3 months | 6.6 | 5.9 | 0.8 | 29.5 | 13 |
| 6 months | 17.9 | 19.8 | −2.2 | N.D | N.D |

As shown in Tables 9 to 19, from the comparison of physical properties before and after γ-ray irradiation, it was shown that the ink of the present invention maintained physical properties suitable as the surgical ink even after the γ-ray irradiation treatment was performed.

In addition, it was confirmed that, regardless of the presence or absence of the γ-ray irradiation treatment, under the storage conditions at 25° C. shown in Tables 8 to 10 and Tables 14 to 16, all the values of the average dispersed particle size, viscosity, and pH were within the most preferable ranges described above even after 3 months. Further, also under the storage conditions at 50° C. shown in Tables 11 to 13 and Tables 17 to 19, it was confirmed that the values of the average dispersed particle size, viscosity and pH after 3 months were all within the preferable ranges described in <3. Properties of surgical ink>

In particular, for the ink of Example 5, it was confirmed that the values of the average dispersed particle size, viscosity, and pH were all within the most preferable ranges described above even after 3 months under both the storage condition at 25° C. and the storage condition at 50° C. Therefore, it was shown that the ink of the present invention can be suitably used as the surgical ink even when the ink is filled in a pen and stored for a long period of time.

(3) Verification of Bending Strength of Pen Tip Portion Before and After γ-Ray Irradiation Next, the bending strength of the pen tip portion 2 of surgical pen A1 before and after γ-ray irradiation was examined. The measurement of the bending strength of the pen tip portion 2 was performed according to the test method (item 8.6, bending strength) specified in JIS Standard "Pencils, coloured pencils and leads for them" (JIS S6006:2020) for both end supports and others with a distance between supporting points of 20 mm. Specific measurement devices and measurement conditions are as follows.

Measuring instrument: Automatic load tester ("MAX-1KN-H-1" Japan Instrumentation System Co., Ltd.)

Attachment for Fixing Pen

Test subject: Center core 20 described in <4. Configuration of surgical pen according to first embodiment>

Setting: The center core 20 is supported with a distance between supporting points of 20 mm, and a load is applied from above to an intermediate point between the supporting points of the center core 20 until the center core 20 breaks. The other measurement conditions were in accordance with JIS S6006 (Pencils, coloured pencils and leads for them), item 8.6, bending strength.

The surgical pen used in this test has the same configuration as that of the surgical pen A1 according to the first embodiment, and the respective materials for constituent members other than the center core 20 are as shown in Table 20 below.

TABLE 20

| Constituent member | | Material |
|---|---|---|
| Shaft body portion 1 | | Made of polypropylene (PP) |
| Pen tip | Pipe 21 | Made of stainless steel (SUS) |
| portion 2 | Chip 22 | High density polyethylene (HDPE) |
| Wadding | Outer sheath 30 | Made of polypropylene (PP) |

TABLE 20-continued

| Constituent member | | Material |
|---|---|---|
| portion 3 | Cotton main body 31 | Made of polyethylene terephthalate (PET) |
| Cap body 4 | Outer cap 41 | Made of polypropylene (PP) |
| | Inner cap 42 | Made of polypropylene (PP) |
| | Pad core 45 | Made of polyethylene terephthalate (PET) |
| Tail plug 5 | | Made of polypropylene (PP) |

Further, in this test, for the center core 20 of the pen tip portion 2 (pen tip main body portion 20*a*), fiber bundle cores obtained by binding synthetic resin fibers made of PET using urethane as a binder, and an extruded core made of PEEK integrally extruded into an inner hollow shape, as core types, having an outer diameter of φ1.3 mm, φ1.4 mm, and φ0.8 mm, respectively, and irradiated with γ-rays were defined as Test Sections 1 to 3. The air efficiency of the center cores in Test Section 1 and Test Section 2 was 52% to 60%.

For comparison and verification, those not irradiated with γ-rays corresponding to each of Test Section 1 to Test Section 3 were defined as Comparative Sections 1 to 3. Furthermore, an extruded core, as a core type, having an outer diameter of @0.8 mm, made of polyacetal (POM), and irradiated with γ-rays was defined as Comparative Section 4, and not irradiated with γ-rays was defined as Comparative Section 5.

For Test Sections 1 to 3 and Comparative Sections 1 to 5, the bending strength before γ-ray irradiation (MPa) and the bending strength after γ-ray irradiation (N) were measured. The values of strength in each of Test Sections 1 to 3 and each of Comparative Sections 1 to 5 were average values of n=10, and the γ-ray irradiation conditions were in accordance with <6. γ-Ray irradiation conditions>. The results are shown in Tables 21 and 22.

TABLE 21

| | Material | Specification | Outer diameter | γ-Ray irradiation | Ink impregnation | Bending strength | Load reduction rate | Maximum load capacity |
|---|---|---|---|---|---|---|---|---|
| Test Section 1 | PET | Fiber bundle core | φ1.4 | Yes | Yes | 41.8 MPa | 0.57% | 2.25N |
| Test Section 2 | PET | Fiber bundle core | φ1.3 | Yes | Yes | 68.2 MPa | −2.05% | 2.94N |
| Test Section 3 | PEEK | Extruded core | φ0.8 | Yes | Yes | 107.0 MPa | 0.90% | 1.08N |

*Load reduction rate: bending strength reduction rate of pen core by γ-ray irradiation

TABLE 22

| | Material | Specification | Outer diameter | γ-Ray irradiation | Ink impregnation | Bending strength | Load reduction rate | Maximum load capacity |
|---|---|---|---|---|---|---|---|---|
| Comparative Section 1 | PET | Fiber bundle core | φ1.4 | No | Yes | 42.1 MPa | — | 2.27N |
| Comparative Section 2 | PET | Fiber bundle core | φ1.3 | No | Yes | 66.8 MPa | — | 2.88N |
| Comparative Section 3 | PEEK | Extruded core | φ0.8 | No | Yes | 108.0 MPa | — | 1.09N |
| Comparative Section 4 | POM | Extruded core | φ0.8 | Yes | Yes | 69.0 MPa | 61.38% | 0.69N |
| Comparative Section 5 | POM | Extruded core | φ0.8 | No | Yes | 178.8 MPa | — | 1.80N |

*Load reduction rate: bending strength reduction rate of pen core by γ-ray irradiation As shown in Table 21 and Table 22, Test Sections 1 to 3 and Comparative Sections 1 to 3 showed stable bending strength before and after γ-ray irradiation. Regarding the maximum load capacity of Test Section 1 to Test Section 3, the maximum load capacity was 2.25 N in Test Section 1, 2.94 N in Test Section 2, and 1.08 N in Test Section 3.

In addition, from the results of Test Section 1 to Test Section 3 and Comparative Section 1 to Comparative Section 3, it was shown that the decrease in bending strength before and after γ-ray irradiation (load reduction rate) was about −2.0 to 0.5%, and there was almost no change.

From the viewpoint of the type of synthetic resin, as shown in Test Sections 1 to 3 and Comparative Sections 1 to 3, the cores made of polyether ether ketone and polyethylene terephthalate showed stable strength before and after γ-ray irradiation.

On the other hand, in Comparative Section 4 to Comparative Section 5 made of polyacetal, as shown in Table 22, both tended to reduce the bending strength significantly after γ-ray irradiation than before γ-ray irradiation. The appearance of the pen tip main body portion **20*a*** after γ-ray irradiation was deformed and broken. This is presumed to be because the molecular structure of the polymer was cleaved and decomposed by a radical reaction generated by irradiation with γ-rays.

(4) Performance Test of Surgical Ink (Ink Composition) Before γ-Ray Irradiation and Surgical Pen Next, performance tests of the surgical ink (ink composition) before γ-ray irradiation and the surgical pen were performed. The surgical pen used in this test was Test Section 1 made of polyethylene terephthalate. The surgical pens filled with Ink Compositions 1 to 5 before γ-ray irradiation were defined as Writing Examples 1 to 5, and the surgical pen filled with Comparative Compositions 1 to 3 as inks for comparison were defined as Comparative Writing Examples 1 to 5.

In addition, the performance tests were (a) machine writing test of surgical pen, (b) fixing drying test, (c) water resistance test, and (d) color development test, respectively. Specific conditions of each test are as follows.

(B) Machine Writing Test of Surgical Pen

Machine writing was performed in accordance with "JIS-S-6037-1986 marking pen". The writing conditions were as follows.

Writing speed: 4.2 m/min

Writing angle: 65° Writing load: 490 mN

Whether or not to discharge ink, whether or not to visually recognize a drawn line, and whether or not to perform re-writing 30 minutes after writing were verified. A case where discharge immediately after ink filling was possible, the drawn line was clearly visible, and re-writing was possible even after the lapse of 30 minutes was shown as ○, and a case where any of these was impossible was shown as x.

(b) Fixing Drying Test

The writing was performed on the skin of the dry back of the hand, and the written portion was rubbed three times with a dry nonwoven fabric, and the presence or absence of extension of the ink and the presence or absence of transfer of the ink to the nonwoven fabric were examined. A case where there was no ink extension and there was no transfer to the nonwoven fabric was shown as ○ in the table, and a case where either of these was not satisfied was shown as x.

(c) Water Resistance Test

The writing was performed on the skin of the dry back of the hand, and after 10 minutes, the written portion was rinsed with running tap water for 1 minute, and the visibility of the drawn line and the presence or absence of smearing were examined. A case where the drawn line was clearly visible and smearing or spreading to the periphery was not confirmed was shown as ○ in the table, and a case where any of these was not satisfied was shown as x.

(d) Color Development Test

The drawn line portion after writing was performed in (c) water resistance test was visually confirmed, and whether the drawn line could be discriminated and the color tone were confirmed. Those in which the drawn line can be well discriminated in black or dark gray were shown as ○, and those in which the drawn line cannot be discriminated were shown as x. The results of these various tests are shown in Table 23.

TABLE 23

| | Machine writing test | Fixing drying test | Water resistance test | Color development test |
|---|---|---|---|---|
| Writing Example 1 | ○ | ○ | ○ | ○ |
| Writing Example 2 | ○ | ○ | ○ | ○ |
| Writing Example 3 | ○ | ○ | ○ | ○ |
| Writing Example 4 | ○ | ○ | ○ | ○ |
| Writing Example 5 | ○ | ○ | ○ | ○ |
| Comparative Writing Example 1 | X | X | ○ | ○ |
| Comparative Writing Example 2 | X | X | Writing impossible | Writing impossible |
| Comparative Writing Example 3 | ○ | ○ | X | X |

As shown in Table 23, in Writing Examples 1 to 5, all the test results were good. On the other hand, in Comparative Writing Example 1 using red iron oxide as a coloring material and Comparative Writing Example 2 using black iron oxide as a coloring material, it was shown that the clogging phenomenon of the ink at the pen tip portion occurred, and not only the writing property was deteriorated but also the fixing drying property was deteriorated. In particular, in Comparative Writing Example 2, writing was impossible in the water resistance test. In addition, in Comparative Writing Example 3 using a water-soluble black dye as a coloring material, smearing occurred, and the writing was not visible.

(5) Biocompatibility Demonstration Test of Surgical Ink and Surgical Marker after γ-Ray Irradiation Furthermore, a biocompatibility demonstration test for examining whether writing on an actual living body is possible was performed using a surgical pen storing the surgical ink of Example 3 by performing γ-ray irradiation treatment in accordance with JIS/ISO standard (JIS T 0806-1/ISO 11137-1 and JIS T 0806-2/ISO 11137-2) on Writing Example 3 before γ-ray irradiation. Using an experimental rat (male SD rat, body weight 292 g to 346 g, "manufactured by Japan SLC, Inc.") as a writing target, writing was performed on the following positions by the following method, and the writing property was confirmed and the written portions were observed over time.

Writing positions: abdominal skin, skull, thigh muscle, tongue, buccal mucosa

Writing method: For the abdominal skin, abdominal hair was cut under general anesthesia, and an ellipse with a width of about 1 cm and a length of about 2 cm was written on the outer skin. In order to confirm the written position, dotted tattoos were applied around the written portions using a blue pigment dispersion liquid ("SA Blue 5636" manufactured by Mikuni-Color Ltd.). For the skull and the thigh muscle, each position was incised under general anesthesia, an ellipse with a width of about 1 cm and a length of about 2 cm was written at each position using a marker pen similarly to the abdominal skin, and the thigh muscle was provided with dotted tattoos and sutured.

The tongue and buccal mucosa were opened under general anesthesia and provided with circular and dotted tattoos with a diameter of about 5 mm. Also, for comparison, writing was performed using a surgical pen ("Tajima marker pen (skin pen)" manufactured by Mizuho Corporation (hereinafter referred to as "Comparative Writing Example 4")) filled with a 0.2% aqueous solution of methylrosanilinium chloride ("Honzo" manufactured by Honzo Pharmaceutical Co., Ltd.) as an ink, and the coloring developability was compared.

Temporal Observation: The written rats were raised at 25° C. for 14 days, and the state of the written portions on Day 7 and Day 14 was confirmed as follows. For the abdominal skin, when the state of the outer skin was confirmed on Day 7, the ink had disappeared, thus the outer skin was excised under general anesthesia, and the degree of deposition on the endothelium was confirmed. For the skull and the thigh muscle, each position was incised again under general anesthesia, visually confirmed, and then sutured. The tongue and buccal mucosa were opened under general anesthesia and visually confirmed.

(Test Results)

Figure 5:
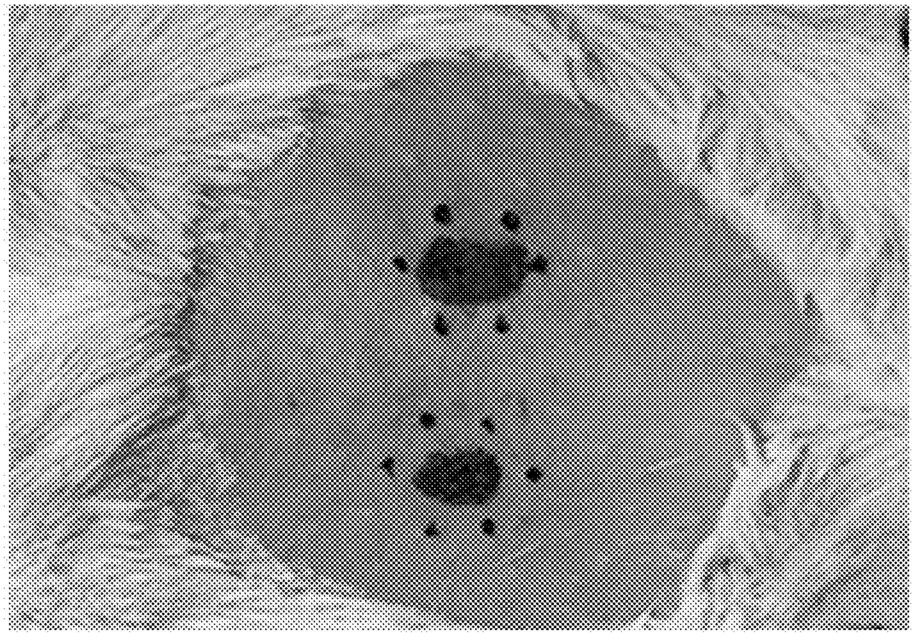
FIG. 5 is a view showing the abdominal outer skin immediately after writing of a rat on which the writing was performed using a surgical pen a and Comparative Writing Example.
Figure 6:
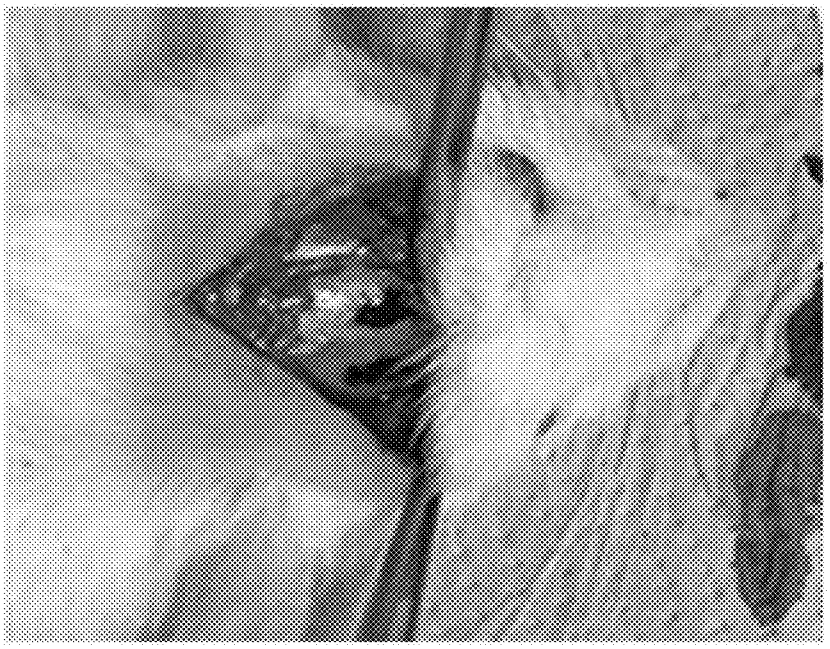
FIG. 6 is a view showing the skull immediately after writing of a rat on which the writing was performed using the surgical pen a and Comparative Writing Example.
Figure 7:
FIG. 7 is a view showing the thigh muscle immediately after writing of a rat on which the writing was performed using the surgical pen a and Comparative Writing Example.
Figure 8:
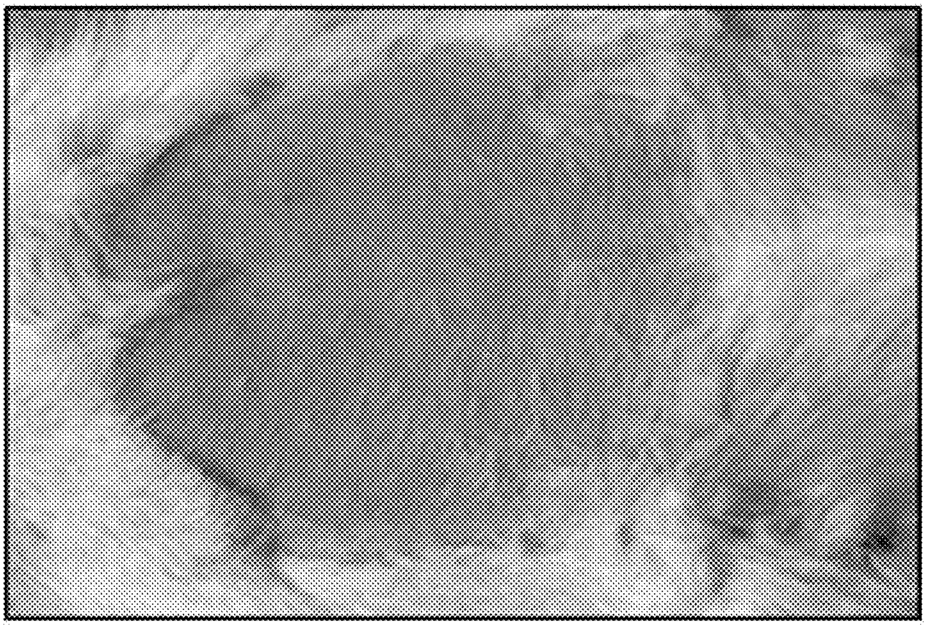
FIG. 8 is a view showing the abdominal outer skin after a lapse of 7 days of a rat on which the writing was performed using the surgical pen a and Comparative Writing Example.

Each of the written portions is shown in FIGS. 5 to 10. In FIG. 5, the lower one of the two ellipses in the drawing is the written portion by the surgical pen, the upper one is the written portion by Comparative Writing Example 4, and dots around each of the two ellipses are tattoos for position confirmation using the blue pigment dispersion liquid. Also, in FIG. 6, the lower ellipse in the drawing is the written portion by the surgical pen, and the upper ellipse is the written portion by Comparative Writing Example 4. In FIG. 7, the left side in the drawing is the thigh muscle written by the surgical pen, and the right side is the thigh muscle written by Comparative Writing Example 4. Also in FIG. 8, writing was performed using the surgical pen and Comparative Writing Example 4 at the same positions as in FIG. 5, but both were lost as follows.

In the writing with the surgical pen, the following good results were obtained in writing at all positions.

Writing property and dischargeability: There was no difficulty in writing such as ink discharge failure and clogging, and writing could be performed without slipping.

Fixability: Even when wetted with blood or the like, the ink was fixed and remained at the written position without flowing.

Coloring developability: The written position was clearly visible. It was confirmed that the written position was visible equal to or more than that by Comparative Writing Example 4. (FIGS. 5, 6, and 7)

Water resistance and drying property: Smearing and blurring did not occur due to blood and body fluid, and the written position was clearly visible.

Figure 9:
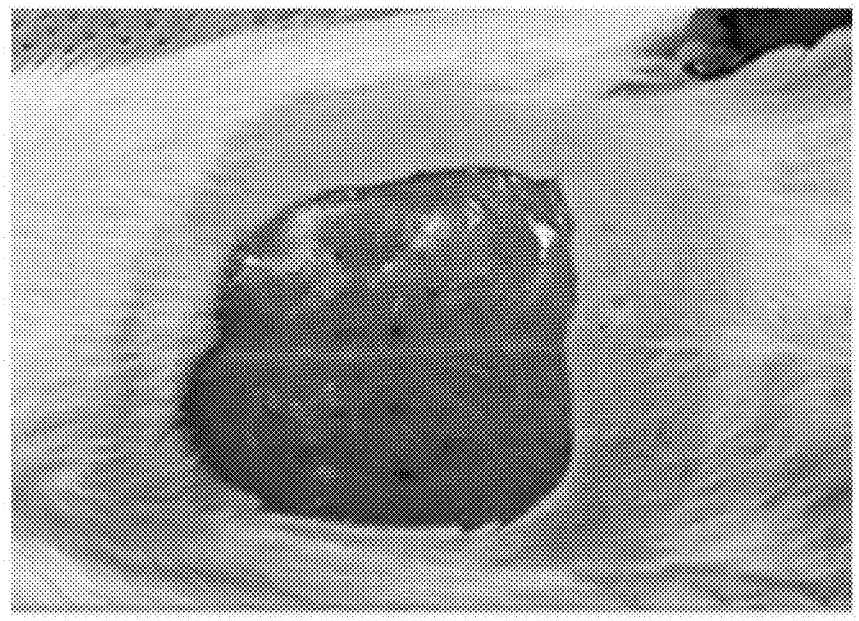
FIG. 9 is a view showing the abdominal endothelium after a lapse of 7 days of a rat on which the writing was performed using the surgical pen a and Comparative Writing Example.
Figure 10:
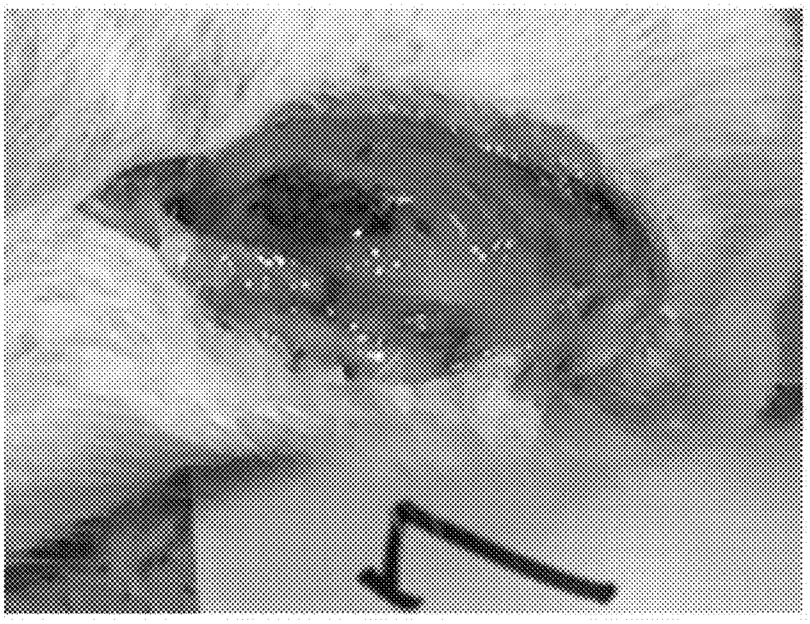

Erasability (temporal confirmation): For the abdominal skin, disappearance of the outer skin ink could be confirmed after 7 days (FIG. 8), and the inner skin immediately below the written outer skin was confirmed, but color deposition and the like were not observed (FIG. 9). For the thigh muscle, disappearance of most of the ink could be confirmed after 14 days (FIG. 10). The tongue and buccal mucosa could not be discriminated. For the skull, it was confirmed that some ink remained after 14 days.

As described above, according to the present invention, it is possible to provide a surgical ink that is suitable for medical devices that ensure safety in accordance with the sterilization validation and can be widely distributed on the market, and has biocompatibility and writing property, and a surgical pen having good writing convenience.

REFERENCE SIGNS LIST

A Surgical pen
1 Shaft body portion
2 Pen tip portion
3 Wadding portion
4 Cap body
5 Tail plug

The invention claimed is:

1. A surgical pen having radiation resistance, comprising:
a cylindrical shaft body portion having a storage part for a surgical ink; and
a pen tip portion for discharging the ink at a distal end of the shaft body portion,
wherein the pen tip portion is made of a synthetic resin, and has a bending strength of 1.0 N or more after irradiation with γ-rays of 25 kGy to 70 kGy,
the surgical ink comprises an activated carbon powder and a water-soluble organic solvent,
the surgical ink comprises
60 to 80 parts by weight of a dispersion liquid containing 8 to 10 wt % of the activated carbon powder, 5 to 7 wt % of a water-soluble polymer, 0.01 to 1.00 wt % of sodium hydroxide, and water as a residue; and
5 to 25 parts by weight of the water-soluble organic solvent, and
the surgical ink has a pH of 4 to 11, an average particle diameter of 150 to 310 nm, and a viscosity of 2.0 to 8.0 mPa·s after irradiation with γ-rays of 25 kGy to 70 kGy.

2. The surgical pen according to claim 1, wherein the surgical ink is stored in the storage part in a state of being impregnated in a wadding portion, and the wadding portion is communicably connected to a base end of the pen tip portion at a distal end.

3. The surgical pen according to claim 1, comprising a holder for writing operation at a tail end part of the shaft body portion,
wherein the holder has a bulging part bulging outward from the tail end of the shaft body portion.

4. The surgical pen according to claim 3, wherein the holder has a second bulging part that covers and bulges an outer peripheral surface of a rear half portion of the shaft body portion, and has a constricted shape by the bulging part and the second bulging part.

5. The surgical pen according to claim 1, comprising a cap body attachable to and detachable from a distal end portion of the shaft body portion, wherein the shaft body portion has a pen tip receiving part which is formed at the distal end portion and is used to mount and fix the pen tip portion, and the cap body includes the pen tip portion in a state of being mounted on the shaft body portion, and has a pressure-bonded surface portion that is crimped into engagement with an outer peripheral wall portion of the pen tip receiving part on an inner peripheral surface portion.

6. The surgical pen according to claim 5, wherein the cap body includes an outer cap and an inner cap arranged inside the outer cap, and the inner cap has a bottomed cylindrical cap main body part having the pressure-bonded surface portion on an inner peripheral surface portion, and a leaf spring part that has a constant gap with an outer peripheral surface of the cap main body part and is bent outward from an opening of the cap main body part and extends, and the inner cap is inserted and fitted to the outer cap with an opening direction being the same as an opening of the outer cap, and is crimped and fixed to the inner peripheral surface of the outer cap via the leaf spring part.

* * * * *